US012784676B2

(12) United States Patent
Shin et al.

(10) Patent No.: US 12,784,676 B2
(45) Date of Patent: Nov. 3, 2026

(54) DISPLAY DEVICE AND METHOD OF DRIVING SAME

(71) Applicant: LG Display Co., Ltd., Seoul (KR)

(72) Inventors: Yong Hyeon Shin, Paju-si (KR); Hoon Sang Ryu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/914,629

(22) Filed: Oct. 14, 2024

(65) Prior Publication Data

US 2025/0157383 A1 May 15, 2025

(30) Foreign Application Priority Data

Nov. 14, 2023 (KR) ........................ 10-2023-0157193

(51) Int. Cl.

*G09G 3/3233* (2016.01)
*G09G 3/20* (2006.01)
*G09G 3/3258* (2016.01)
*G09G 3/3266* (2016.01)

(52) U.S. Cl.

CPC ......... *G09G 3/3233* (2013.01); *G09G 3/2074* (2013.01); *G09G 3/3258* (2013.01); *G09G 3/3266* (2013.01); *G09G 2300/0426* (2013.01); *G09G 2300/0819* (2013.01); *G09G 2300/0842* (2013.01); *G09G 2300/0852* (2013.01); *G09G 2300/0861* (2013.01); *G09G 2310/061* (2013.01); *G09G 2310/08* (2013.01); *G09G 2320/04* (2013.01)

(58) Field of Classification Search

CPC .. G09G 3/2074; G09G 3/3233; G09G 3/3258; G09G 3/3266; G09G 2300/0819; G09G 2300/0852; G09G 2300/0861; G09G 2310/061; G09G 2310/08; G09G 2320/04; G09G 2300/0426; G09G 2300/0842

See application file for complete search history.

(56) References Cited

U.S. PATENT DOCUMENTS

| | | | | |
|---|---|---|---|---|
| 10,916,198 | B2 | 2/2021 | Lin et al. | |
| 12,020,640 | B2 | 6/2024 | Kim | |
| 2020/0226978 | A1 * | 7/2020 | Lin | H10K 59/1213 |
| 2022/0122534 | A1 | 4/2022 | Kim | |
| 2024/0304147 | A1 | 9/2024 | Kim | |

FOREIGN PATENT DOCUMENTS

| | | | |
|---|---|---|---|
| KR | 10-2020-0087711 | A | 7/2020 |
| KR | 10-2022-0052747 | A | 4/2022 |

* cited by examiner

*Primary Examiner* — Adam R. Giesy
(74) *Attorney, Agent, or Firm* — Fenwick & West LLP

(57) ABSTRACT

A display device includes a light emitting element including an anode to which driving power is input and a cathode to which a low power is applied, a driving TFT including a first electrode to which high power is input, a second electrode to which the driving power is applied, and a gate electrode, a switching unit configured to apply a first voltage for sensing characteristics of the driving TFT or a second voltage for driving the driving TFT when an on-level scan signal is input, and an anode reset unit configured to apply an anode reset voltage to the anode of the light emitting element in association with the switching unit.

11 Claims, 16 Drawing Sheets

DISPLAY DEVICE AND METHOD OF DRIVING SAME

CROSS-REFERENCE TO RELATED APPLICATION

This application claims the benefit of Republic of Korea Patent Application No. 10-2023-0157193, filed on Nov. 14, 2023, which is hereby incorporated by reference in its entirety.

BACKGROUND

Field of Technology

The present disclosure relates to a display device and a method of driving the same.

Discussion of the Related Art

Electroluminescent display devices have the advantages of high response speed, high luminous efficacy, and wide viewing angle. An electroluminescent display device includes a plurality of subpixels and can display an image by light emitting elements of subpixels emitting light. Light emitting elements are implemented based on organic or inorganic materials.

An electroluminescent display device can display images based on light generated from each light emitting element by adjusting the amount of current applied to light emitting elements within subpixels. Accordingly, a previously displayed image may affect the next displayed image. For example, when an image pattern changes from black to white, shooting amount ratio (SAR) overshoot causing the luminance of the first frame to increase may be generated compared to change from white to white.

Therefore, in order to improve image quality, it is necessary to improve the accuracy of a pixel driving circuit that controls light emission of subpixels.

SUMMARY

Accordingly, the present disclosure is directed to a display device and a method of driving the same that substantially obviate one or more problems due to limitations and disadvantages of the related art.

An object of the present disclosure is to provide a display device including a pixel driving circuit for accurate grayscale expression and a method of driving the same.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a display device includes a light emitting element including an anode to which driving power is input and a cathode to which a low power is applied, a driving TFT including a first electrode to which high power is input, a second electrode to which the driving power is applied, and a gate electrode, a switching unit configured to apply a first voltage for sensing characteristics of the driving TFT or a second voltage for driving the driving TFT when an on-level scan signal is input, and an anode reset unit configured to apply an anode reset voltage to the anode of the light emitting element in association with the switching unit.

The switching unit may include a first switching TFT configured to apply the second voltage to the gate electrode of the driving TFT when a first scan signal at an on level is input, and a second switching TFT configured to apply the first voltage to the gate electrode of the driving TFT when a second scan signal at the on level is input.

The anode reset unit may include a first anode reset TFT configured to apply a first anode reset voltage to the anode of the light emitting element when the first scan signal at the on level is input, and a second anode reset TFT configured to apply a second anode reset voltage to the anode of the light emitting element when the second scan signal at the on level is input.

The switching unit may include a third switching TFT configured to apply an initialization voltage to a source electrode of the driving TFT when a third scan signal at the on level is input.

The anode reset unit may include a third anode reset TFT configured to apply a third anode reset voltage to the anode of the light emitting element when the third scan signal at the on level is input.

The first anode reset voltage, the second anode reset voltage, and the third anode reset voltage may have the same magnitude.

The display device may further include a capacitor having a first electrode connected to the gate electrode and a second electrode connected to the second electrode. In another embodiment of the present disclosure, a display device includes a light emitting element, a driving TFT including a first electrode connected to a first node, a second electrode connected to a second node, and a gate electrode connected to a third node and configured to apply a current according to a reference voltage applied to the third node to the second node during a sensing operation and to control a high voltage applied to the first node according to a data voltage applied to the gate electrode and apply the controlled high voltage to the second node during an emission operation, a first switching TFT including a gate electrode to which a first scan signal is input, a first electrode connected to a data line through which the data voltage is applied, and a second electrode connected to the third node, a second switching TFT including a gate electrode to which a second scan signal is input, a first electrode connected to a reference voltage line through which the reference voltage is applied, and a second electrode connected to a fourth node connected to the third node, a capacitor connected between the fourth node and the second node, a first anode reset TFT including a gate electrode to which the first scan signal is input, a first electrode connected to a power line to which an anode reset voltage is applied, and a second electrode connected to an anode of the light emitting element, and a second anode reset TFT including a gate electrode to which the second scan signal is input, a first electrode connected to a power line to which the anode reset voltage is applied, and a second electrode connected to the anode of the light emitting element.

The display device may further include a third switching TFT including a gate electrode to which a third scan signal is input, a first electrode connected to a power line to which an initialization voltage is applied, and a second electrode connected to the second node, and a third anode reset TFT including a gate electrode to which the third scan signal is input, a first electrode connected to the power line to which the anode reset voltage is applied, and a second electrode connected to the anode of the light emitting element.

The display device may further include a first emission control TFT including a gate electrode through which a first emission signal is input, a first electrode to which high power is applied, and a second electrode connected to the first node, and a second emission control TFT including a gate electrode through which a second emission signal is input, a first electrode connected to the second node, and a second electrode connected to the anode of the light emitting element.

In another embodiment of the present disclosure, a method of driving a display device including a display panel including a plurality of subpixels having light emitting elements includes an initialization step of initializing a gate electrode and a source electrode of a driving TFT of each subpixel, a sensing step of sensing a threshold voltage of the driving TFT, a data writing step of writing a data voltage for driving the driving TFT, and an emission step of causing the subpixels to emit light according to the data voltage, wherein anodes of the light emitting elements are reset in at least one of the sensing step or the data writing step.

The method may further include resetting the anodes of the light emitting elements between the data writing step and the emission step.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
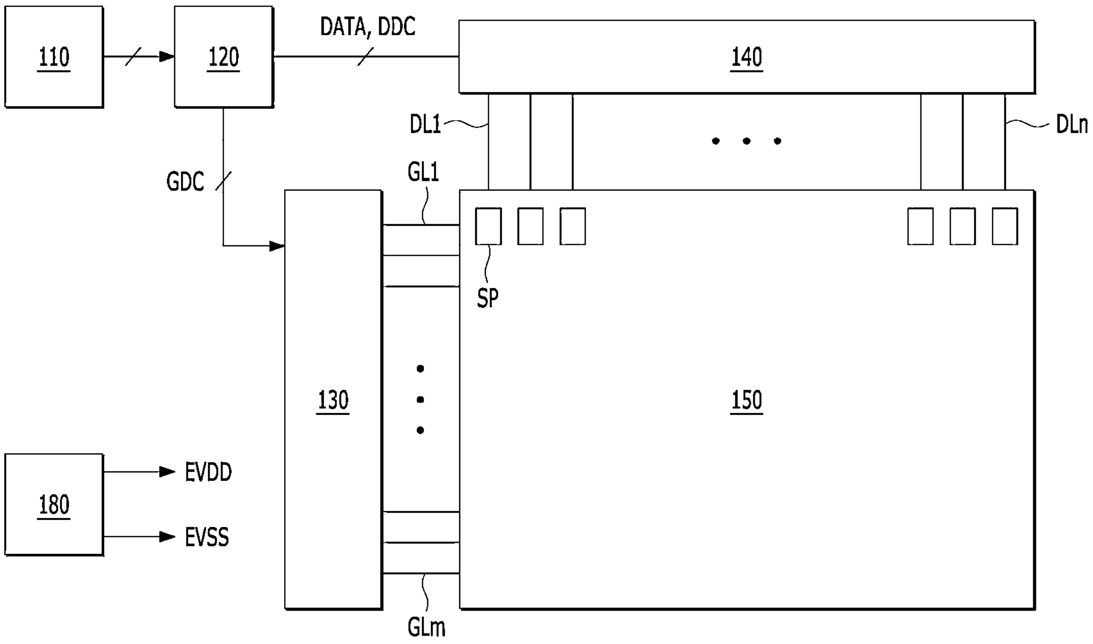
FIG. 1 is a block diagram schematically showing a configuration of a display device according to an embodiment of the present disclosure.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be through and complete and will fully convey the scope to those skilled in the art.

The shapes, sizes, ratios, angles, numbers, and the like, which are illustrated in the drawings in order to describe various embodiments of the present disclosure, are merely given by way of example, and therefore, the present disclosure is not limited to the illustrations in the drawings. In the present disclosure, when the terms "comprise", "include", and the like are used, other elements may be added unless the term "only" is used. The singular forms are intended to include the plural forms as well, unless the context clearly indicates otherwise.

In interpretation of a component, the component is interpreted as including an error range unless otherwise explicitly described.

When describing positional relationships, for example, when the positional relationship between two parts is described using "on", "above", "below", "beside", or the like, one or more other parts may be located between the two parts unless the term "directly" or "closely" is used.

In the description of the various embodiments of the present disclosure, although terms such as, for example, "first" and "second" may be used to describe various elements, these terms are merely used to distinguish the same or similar elements from each other. Therefore, in the present disclosure, an element modified by "first" may be the same as an element modified by "second" within the technical scope of the present disclosure unless mentioned otherwise.

In addition, a pixel circuit of a display device which will be described below may include a plurality of transistors. Transistors may be implemented as oxide thin film transistor (TFTs) containing an oxide semiconductor, low temperature polysilicon (LTPS) TFTs containing LTPS, and the like. Each transistor may be implemented as a p-channel TFT or an n-channel TFT.

A transistor is a three-electrode device including a gate, a source, and a drain. The source is an electrode that supplies carriers to the transistor. Within the transistor, carriers flow from the source. The drain is the electrode through which carriers exit the transistor. In a transistor, carriers flow from the source to the drain. In the case of an n-channel transistor, carriers are electrons, and thus the source voltage is lower than the drain voltage such that electrons can flow from the source to the drain. In an n-channel transistor, current flows from the drain to the source. In the case of a p-channel transistor (PMOS), carriers are holes, and thus the source voltage is higher than the drain voltage such that holes can flow from the source to the drain. In a p-channel transistor, current flows from the source to the drain because holes flow from the source to the drain. It should be noted that the source and the drain of a transistor are not fixed. For example, the source and the drain may change depending on the applied voltage. Therefore, the present disclosure is not limited by the source and the drain of a transistor. In the following description, the source and the drain of a transistor will be referred to as first and second electrodes.

A gate signal swings between a gate-on voltage and a gate-off voltage. The gate-on voltage is set to a voltage higher than a threshold voltage of the transistor, and the gate-off voltage is set to a voltage lower than the threshold voltage of the transistor. A transistor is turned on in response to the gate-on voltage and turned off in response to the gate-off voltage. For an n-channel transistor, the gate-on voltage may be a gate high voltage VGH, and the gate-off voltage may be a gate low voltage VGL. For a p-channel transistor, the gate-on voltage may be the gate low voltage VGL, and the gate-off voltage may be the gate high voltage VGH.

Each pixel of an electroluminescent display device includes a light emitting element and a driving element that generates a pixel current according to a voltage between a gate and a source to drive the light emitting element. The light emitting element includes an anode, a cathode, and an organic compound layer formed between the anode and the cathode. The organic compound layer may include a hole injection layer (HIL), a hole transport layer (HTL), an emission layer (EML), an electron transport layer (ETL), an electron injection layer (EIL), etc., but are not limited thereto. When a pixel current flows through the light emitting element, holes that have passed through the hole transport layer (HTL) and electrons that have passed through the electron transport layer (ETL) move to the emission layer (EML), forming excitons, and as a result, the emission layer (EML) emits visible light.

Recently, there has been an increasing number of attempts to implement some transistors included in a pixel circuit of electroluminescent display devices as oxide transistors. For oxide transistors, an oxide, that is, IGZO which is a compound of indium (In), gallium (Ga), zinc (Zn), and oxygen (O), is used instead of polysilicon as a semiconductor material.

Oxide transistors have lower electron mobility than low temperature polysilicon (LTPS) transistors, but have more than 10 times higher electron mobility than amorphous silicon transistors. Further, the oxide transistors have higher manufacturing costs than amorphous silicon transistors, but have much lower manufacturing costs than low temperature polysilicon transistors. In addition, oxide transistor manufacturing processes are similar to those of amorphous silicon transistors, and thus existing facilities can be utilized, which is efficient. In particular, since oxide transistors have a low off-current, the oxide transistors have the advantages of high driving stability and reliability during a low-speed operation in which a transistor off period is relatively long. Therefore, oxide transistors can be used in large liquid crystal displays that require high-resolution and low-power operation, or in OLED TVs that cannot achieve the screen size using a low-temperature polysilicon process.

Like reference numerals refer to substantially like elements throughout the specification. Hereinafter, embodiments of the present disclosure will be described in detail with reference to the attached drawings. In the following description, when it is determined that detailed description of a known function or configuration related to the present disclosure may unnecessarily obscure the subject matter of the present disclosure, the detailed description will be omitted.

FIG. 1 is a block diagram schematically showing a configuration of a light emitting display device according to an embodiment of the present disclosure.

Referring to FIG. 1, the light emitting display device may include an image provider 110, a timing controller 120, a scan driver 130, a data driver 140, a display panel 150, and a power supply 180.

The image provider 110 (e.g., a circuit) may output various driving signals in addition to image data signals supplied from the outside or image data signals stored in an internal memory. The image provider 110 may supply data signals and various driving signals to the timing controller 120.

The display panel 150 includes a plurality of data lines DL1 to DLn extending in a column direction (or vertical direction), a plurality of gate lines GL1 to GLm extending in a row direction (or horizontal direction) intersecting the data lines, and subpixels SP arranged in a matrix form at the intersections to form a pixel array. Subpixels SP arranged on the same pixel line operate simultaneously according to a scan signal and an emission signal EM applied from the same gate line GL. Each subpixel SP includes a light emitting element and a pixel circuit that controls the amount of current applied to an anode of the light emitting element. The pixel circuit may include a driving transistor that controls the amount of current such that a specific amount of current flows through the light emitting element. The light emitting element emits light during an emission period and does not emit light during periods other than the emission period. During periods other than the emission period, initialization of the pixel circuit, programming, and reset of the light emitting element may be performed.

The timing controller 120 may output a gate timing control signal GDC for controlling an operation timing of the scan driver 130, a data timing control signal DDC for controlling an operation timing of the data driver 140, and various synchronization signals (a vertical synchronization signal Vsync and a horizontal synchronization signal Hsync). The timing controller 120 may supply a data signal DATA supplied from the image provider 110 along with the data timing control signal DDC to the data driver 140. The timing controller 120 may be formed in the form of an integrated circuit (IC) and mounted on a printed circuit board, but is not limited thereto.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply the data voltage to the subpixels included in the display panel 150 through the data lines DL1 to DLn. The data driver 140 may take the form of an IC and be mounted on the display panel 150 or on a printed circuit board, but is not limited thereto.

The scan driver 130 may output a scan signal and an emission signal in response to the gate timing control signal GDC supplied from the timing controller 120. The scan driver 130 may supply at least one scan signal and an emission signal to the subpixels included in the display panel 150 through the gate lines GL1 to GLm. The scan driver 130 may take the form of an IC or be directly formed on the display panel 150 in a gate-in-panel structure.

The power supply 180 may convert power supplied from the outside into power required to drive the display device under the control of the timing controller 120 and output the converted power. For example, the power supply 180 may convert power supplied from the outside into a high voltage EVDD and a low voltage EVSS, output the voltages, and generate and output voltages (e.g., gate voltages including a gate high voltage and a gate low voltage) required to drive the scan driver 130 or voltages (drain voltages including a drain voltage and a half drain voltage) required to drive the data driver 140.

Figure 2:
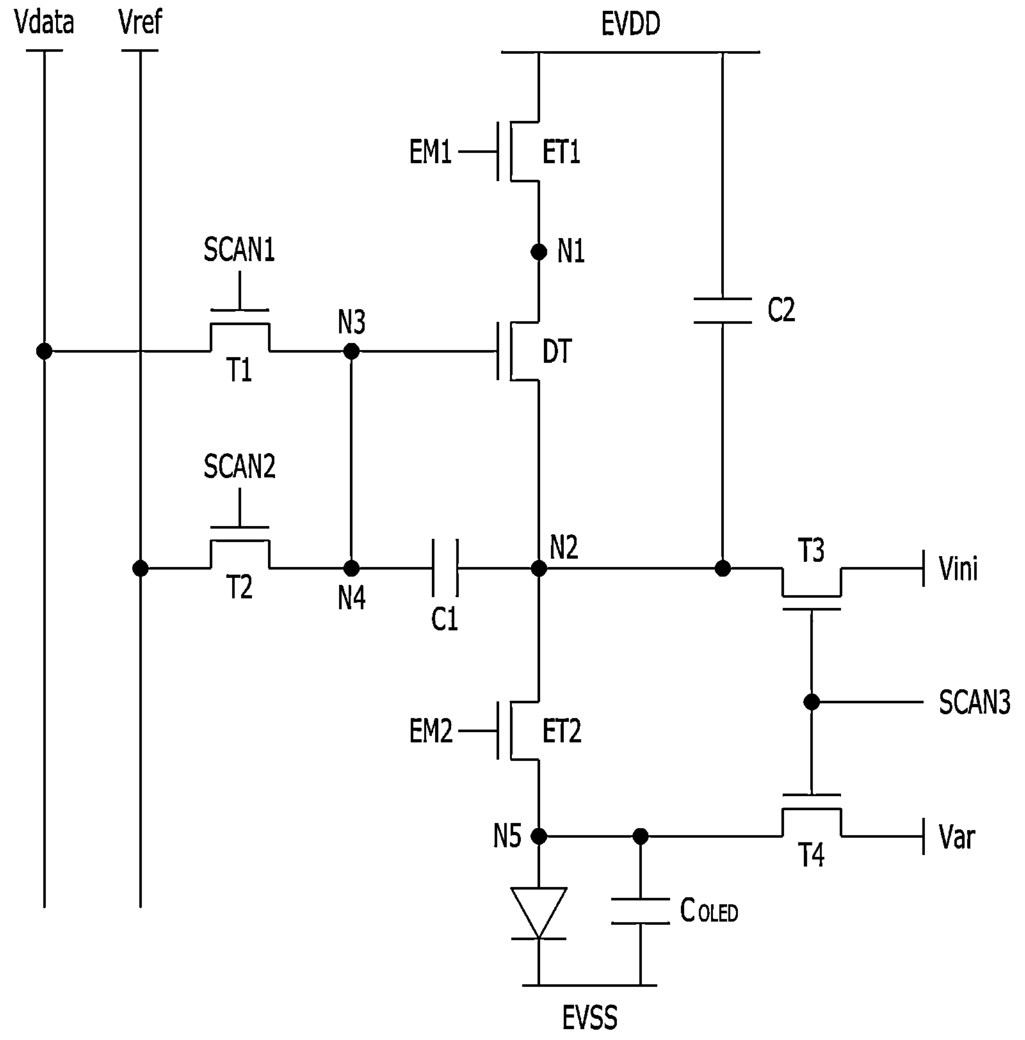
FIG. 2 is an equivalent circuit diagram of one subpixel included in the display device of FIG. 1 according to an embodiment of the present disclosure.
Figure 3:
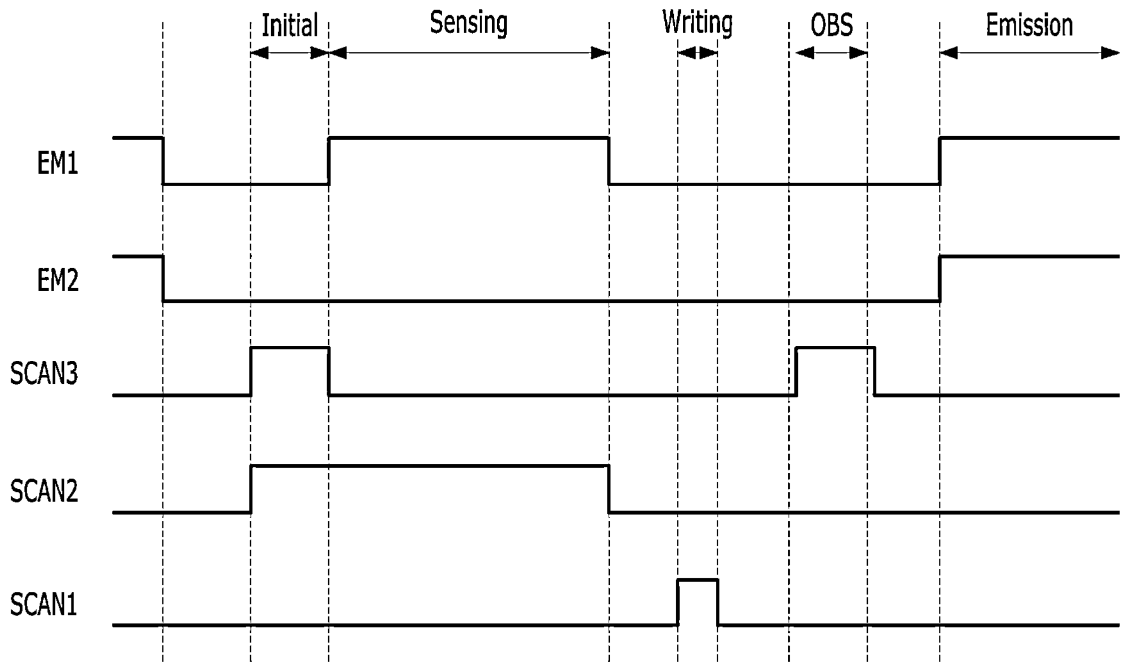
FIG. 3 is a diagram illustrating driving waveforms of the subpixel of FIG. 2 according to an embodiment of the present disclosure.

FIG. 2 is an equivalent circuit diagram of one subpixel included in the light emitting display device of FIG. 1 according to one embodiment, and FIG. 3 is a diagram illustrating driving waveforms of the subpixel of FIG. 2 according to one embodiment. In the following description, a first electrode of a transistor may be one of a source electrode and a drain electrode, and a second electrode of the transistor may be the other one of the source electrode and the drain electrode.

One subpixel SP may be provided with a high voltage EVDD, a low voltage EVSS, a reference voltage Vref, a data voltage Vdata, an initialization voltage Vini, and an anode reset voltage Var and may receive first to third scan signals SCAN1 to SCAN3, a first emission signal EM1, and a second emission signal EM2.

One subpixel SP may include an organic light emitting diode (OLED), a driving TFT DT, a first capacitor C1, a second capacitor C2, a first emission control TFT ET1, a second emission control TFT ET2, and first to fourth switching TFTs T1 to T4. Each TFT of the subpixel SP may be configured as a p-type MOSFET PMOS or an n-type MOSFET NMOS, or may be configured by mixing a p-type MOSFET PMOS and an n-type MOSFET NMOS. A case where the subpixel SP according to the embodiment of the present disclosure is implemented as an n type is described, but the present disclosure is not limited thereto.

The OLED emits light by a driving current supplied from the driving TFT DT. The anode of the OLED is connected to a fifth node N5, and the cathode of the OLED is connected to a line through which the low voltage EVSS is supplied.

The gate electrode of the driving TFT DT is connected to a third node N3, the first electrode thereof is connected to a first node N1, and the second electrode thereof is connected to a second node N2. The driving TFT DT can generate a driving current in response to the data voltage Vdata.

The first emission control TFT ET1 and the second emission control TFT ET2 control emission of the OLED. The first emission control TFT ET1 is turned on/off according to the first emission signal EM1 input to the gate electrode thereof, and the second emission control TFT ET2 is turned on/off according to the second emission signal EM2 input to the gate electrode thereof.

The first emission control TFT ET1 may have a first electrode to which the high voltage EVDD is applied and a second electrode connected to the first node N1. The first emission control TFT ET1 may serve to transmit the high voltage EVDD to the first electrode of the driving TFT DT in response to the first emission signal EM1.

The second emission control TFT ET2 may have a first electrode connected to the second node N2 and a second electrode connected to the fifth node N5. The second emission control TFT ET2 may serve to transmit the driving current to the fifth node N5 to which the anode of the OLED is connected in response to the second emission signal EM2.

The first switching TFT T1 applies the data voltage Vdata to the third node N3 to which the gate electrode of the driving TFT DT is connected. The first switching TFT T1 may include a gate electrode to which the first scan signal SCAN1 is input, a first electrode connected to a data line to which the data voltage Vdata is supplied, and a second electrode connected to the third node N3. The first switching TFT T1 may be implemented as an n-type oxide TFT. Accordingly, the first switching TFT T1 applies the data voltage Vdata supplied from the data line to the third node N3 to which the gate electrode of the driving TFT DT is connected in response to a high-level first scan signal SCAN1, which is a turn-on voltage.

The second switching TFT T2 applies the reference voltage Vref to a fourth node N4. The second switching TFT T2 may include a gate electrode to which the second scan signal SCAN2 is input, a first electrode connected to a reference voltage line through which the reference voltage Vref is supplied, and a second electrode connected to the fourth node N4. The second switching TFT T2 may be implemented as an n-type oxide TFT. Accordingly, the second switching TFT T2 applies the reference voltage Vref supplied from the reference voltage line to the fourth node N4 in response to the high-level second scan signal SCAN2, which is the turn-on voltage.

The third switching TFT T3 applies the initialization voltage *Vini* to the second node N2 to which the source electrode of the driving TFT DT is connected. The third switching TFT T3 may include a gate electrode to which the third scan signal SCAN3 is input, a first electrode to which the initialization voltage *Vini* is applied, and a second electrode connected to the second node N2.

The fourth switching TFT T4 is turned on/off by the third scan signal SCAN3 together with the third switching TFT T3 to apply the anode reset voltage Var to the fifth node N5 to which the anode of the OLED is connected. The fourth switching TFT T4 may include a gate electrode to which the third scan signal SCAN3 is input, a first electrode to which the anode reset voltage Var is applied, and a second electrode connected to the fifth node N5.

The first capacitor C1 maintains the data voltage Vdata stored in the subpixel SP for one frame. One electrode of the first capacitor C1 is connected to the fourth node N4, and the other electrode is connected to the second node N2.

The second capacitor C2 serves to improve driving efficiency according to a driving current by reflecting a change in the source electrode of the driving TFT as much as a change in the gate electrode of the driving TFT DT when the reference voltage Vref changes to the data voltage Vdata. One electrode of the second capacitor C2 is connected to the high voltage EVDD, and the other electrode is connected to the second node N2.

FIG. 3 is a diagram illustrating driving waveforms of the subpixel of FIG. 2.

The operation of the subpixel SP of the light emitting display device according to an embodiment of the present disclosure will be described with reference to FIGS. 2 and 3.

A driving period of the subpixel SP may include an initial period Initial, a sensing period Sensing, a data writing period Writing, an on bias stress (OBS) period OBS, and an emission period Emission.

During the initial period Initial, the second scan signal SCAN2 and the third scan signal SCAN3 are applied as high signals at an on level, and the first emission signal EM1, the second emission signal EM2, and the first scan signal SCAN1 are applied as low signals at an off level. When the second scan signal SCAN2 is applied at the on level, the second switching TFT T2 is turned on. The second switching TFT T2 applies the reference voltage Vref supplied through the reference line to the fourth node N4 and the third node N3 in response to the second scan signal SCAN2 at the on level. Accordingly, the reference voltage Vref is applied to the gate electrode of the driving TFT DT connected to the third node N3. When the third scan signal SCAN3 is applied at the on level, the third switching TFT T3 and the fourth switching TFT T4 are turned on. The third switching TFT T3 applies the initialization voltage Vini to the second node N2 in response to the third scan signal SCAN3 at the on level. Accordingly, the initialization voltage Vini is applied to the source electrode of the driving TFT DT connected to the second node N2. The fourth switching TFT T4 applies the anode reset voltage Var to the fifth node N5 in response to the third scan signal SCAN3 at the on level. Accordingly, the anode reset voltage Var is applied to the anode of the OLED connected to the fifth node N5. As described above, during the initial period Initial, the reference voltage Vref is applied to the gate electrode of the driving TFT DT, the initialization voltage Vini is applied to the source electrode of the driving TFT DT, and the anode reset voltage Var is applied to the anode of the OLED.

During the sensing period Sensing, the first emission signal EM1 and the second scan signal SCAN2 are applied as high signals at an on level, and the second emission signal EM2, the first scan signal SCAN1, and the third scan signal SCAN3 are applied as low signals at an off level. When the first light emission signal EM1 is applied at the on level, the first emission control TFT ET1 is turned on. The first emission control TFT ET1 applies the high voltage EVDD to the first node N1 in response to the first emission signal EM1 at the on level. Accordingly, the high voltage EVDD is applied to the drain electrode of the driving TFT DT connected to the first node N1. The second switching TFT T2 applies the reference voltage Vref supplied through the reference line to the third node N3 to which the gate electrode of the driving TFT DT is connected in response to the second scan signal SCAN2 at the on level.

During the sensing period Sensing, high voltage EVDD is applied to the drain electrode of the driving TFT DT and the reference voltage Vref is applied to the gate electrode thereof, and thus a channel is formed between the drain and source electrodes of the driving TFT DT due to the gate-source voltage Vgs of the driving TFT DT and a current Ids flows. Due to the current Ids flowing from the drain electrode to the source electrode, the voltage of the second node N2 increases until the gate-source voltage Vgs of the driving TFT DT reaches a threshold voltage Vth. Thereafter, when both the first emission control TFT ET1 and the second switching TFT T2 are turned off, the threshold voltage Vth corresponding to the gate-source voltage Vgs of the driving TFT DT may be stored as a compensation voltage in the first capacitor C1 connected between the third node N3 and the second node N2. As described above, the threshold voltage Vth of the driving TFT DT may be sensed and sampled to the first capacitor C1 during the sensing period Sensing.

During the data writing period Writing, the first scan signal SCAN1 is applied as an on-level high signal, and the first emission signal EM1, the second emission signal EM2, the second scan signal SCAN2, and the third scan signal SCAN3 are applied as on-level high signals. When the first scan signal SCAN1 is applied at the on level, the first switching TFT T1 is turned on. The first switching TFT T1 applies the data voltage Vdata supplied through the data line to the third node N3 to which the gate electrode of the driving TFT DT is connected in response to the first scan signal SCAN1 at the on level. When data writing is completed and the first switching TFT T1 is turned off, the data voltage Vdata may be stored in the first capacitor C1 along with the compensation voltage of the threshold voltage Vth.

During the OBS period OBS, the third scan signal SCAN3 is applied as an on-level high signal, and the first emission signal EM1, the second emission signal EM2, the first scan signal SCAN1, and the second scan signal SCAN2 are applied as off-level low signals. When the third scan signal SCAN3 is applied at the on level, the third switching TFT T3 and the fourth switching TFT T4 are turned on. The third switching TFT T3 applies the initialization voltage Vini to the second node N2 in response to the third scan signal SCAN3 at the on level. The fourth switching TFT T4 applies the anode reset voltage Var to the fifth node N5 in response to the third scan signal SCAN3 at the on level. Accordingly, the anode reset voltage Var is applied to the anode of the OLED connected to the fifth node N5.

During the emission period Emission, the first emission signal EM1 and the second emission signal EM2 are applied as on-level high signals, and the first scan signal SCAN1, the second scan signal SCAN2, and the third scan signal SCAN3 are applied as off-level low signals. When the first emission signal EM1 is applied at the on level, the first emission control TFT ET1 is turned on, and when the second emission signal EM2 is applied at the on level, the second emission control TFT ET2 is turned on. The high voltage EVDD is applied to the first node N1 as the first emission control TFT ET1 is turned on, and a current path is formed between the second node N2 and the fifth node N5 as the second emission control TFT ET2 is turned on. Accordingly, a driving current Ioled generated through the drain electrode and the source electrode of the driving TFT DT according to the compensation voltage and the data voltage Vdata stored in the first capacitor C1 may be applied to the OLED and thus the OLED emits light.

As described above, the driving period of the subpixel SP includes the initial period Initial, the sensing period Sensing, the data writing period Writing, the OBS period OBS, and the emission period Emission, the compensation voltage and the data voltage Vdata may be written during the sensing period Sensing and the data writing period Writing, and then the anode of the OLED may be reset and the OLED may be caused to emit light during the OBS period OBS.

A display device including subpixels SP having this configuration may have differences in discharging delay for the voltage $C_{OLED}$ charged in the OLED to be discharged due to the difference between an image pattern displayed in the previous frame and an image pattern displayed in the current frame. For example, in a case where an image pattern changes from black to white (Black→White) and a case where the image pattern changes from white to white (White→White), discharging time of the voltage $C_{OLED}$ charged in the OLED may be different. Differences in the discharging time of the OLED cause differences in the voltage of the anode of the OLED. The voltage of the anode of the OLED may affect the source electrode of the driving TFT DT during the sensing period Sensing and affect the gate electrode during the data writing period Writing. Accordingly, due to differences in OLED discharging time caused by image patterns, shooting amount ratio (SAR) overshoot that causes the luminance of the first frame to increase may occur in the case of change from black to white (Black→White) rather than in the case of change from white to white (White→White).

Figure 4A:
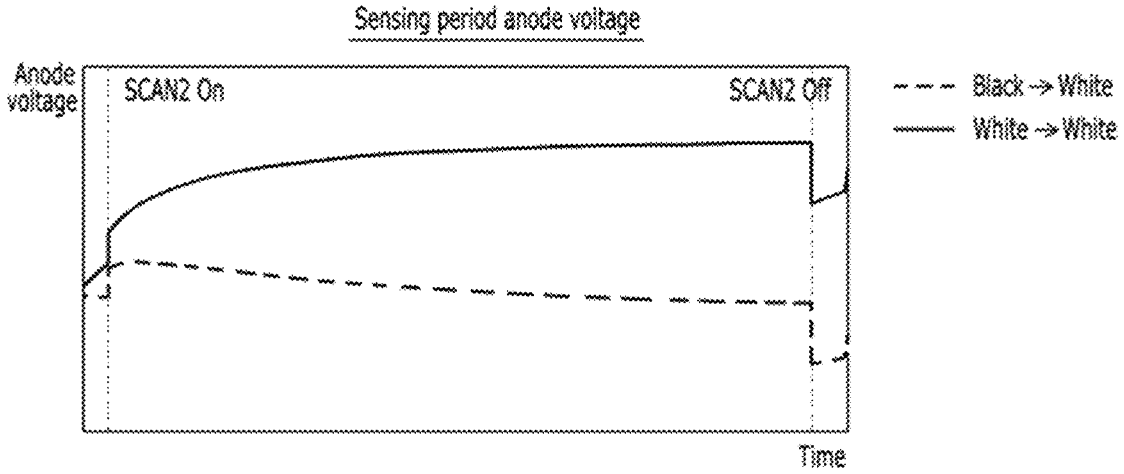
FIG. 4A, 4B, 4C are a diagram for describing shooting amount ratio (SAR) overshoot of a display device according to an embodiment of the present disclosure.
Figure 4B:
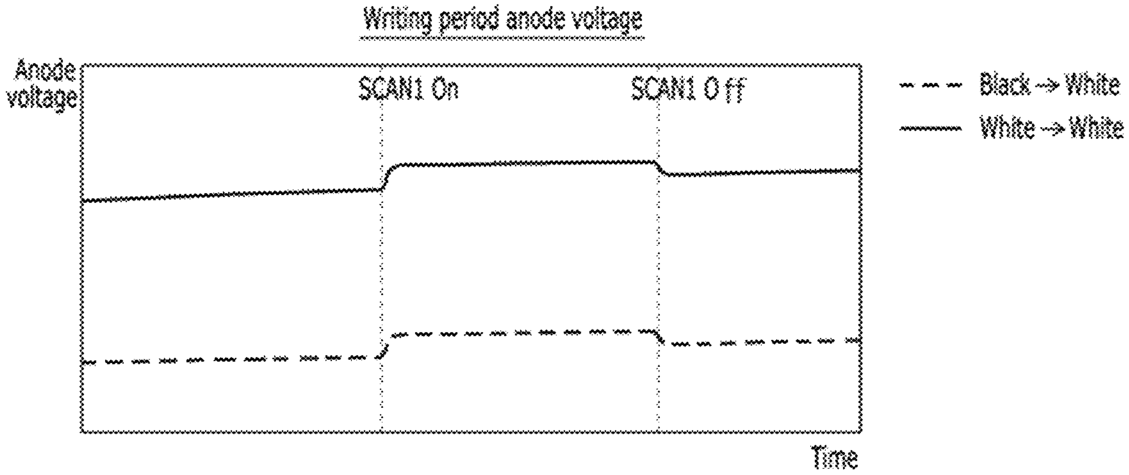
Figure 4C:
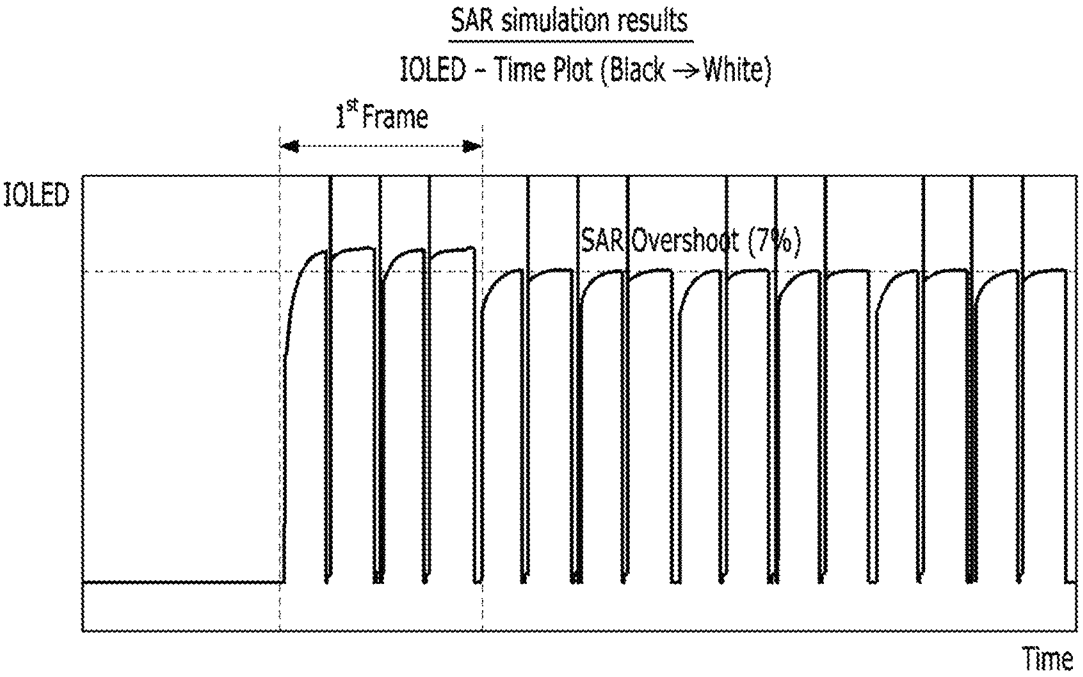

FIG. 4A to 4C are a diagram for describing results of simulating the SAR of a display device according to one embodiment.

FIG. 4A is a graph showing results of simulations of changes in the anode voltage during each sensing period Sensing in a case where an image pattern changes from black to white (Black→White) and a case where the image pattern changes from white to white (White→White). During the sensing period Sensing, the second scan signal SCAN2 is applied at the on level, and thus the second switching TFT T2 applies the reference voltage Vref to the gate electrode of the driving TFT DT. During the sensing period Sensing, the threshold voltage Vth of the driving TFT DT may be sensed on the basis of the potential change in the source electrode of the driving TFT DT as the reference voltage Vref is applied to the gate electrode. Here, the source electrode of the driving TFT DT is coupled with the anode of the OLED.

Referring to the simulation graph in FIG. 4A, it can be ascertained that the anode voltage when the image pattern changes from black to white (Black→White) is lower than the anode voltage when the image pattern changes from white to white (White→White) during the sensing period Sensing.

FIG. 4B is a graph showing results of simulations of changes in the anode voltage during each data writing period Writing in a case where an image pattern changes from black to white (Black→White) and a case where the image pattern changes from white to white (White→White). During the data writing period Writing, the first scan signal SCAN1 is applied at the on level and the data voltage Vdata is applied to the gate electrode of the driving TFT DT. Here, the gate electrode of the driving TFT DT is coupled with the anode of the OLED.

Referring to the simulation graph in FIG. 4B, it can be ascertained that the anode voltage when the image pattern changes from black to white (Black→White) is lower than the anode voltage when the image pattern changes from white to white (White→White) during the data writing period Writing.

As described above, when the image pattern changes from black to white (Black→White), the anode voltage is low, and thus the gate-source voltage Vgs of the driving TFT DT may increase compared to the case of changing from white to white (White→White) due to a difference between coupling between the anode and the source electrode during the sensing period and coupling between the anode and the gate electrode during the data writing period.

FIG. 4C is a graph showing results of simulations of changes in the current value of the OLED over time when an image pattern changes from black to white (Black→White).

Referring to FIG. 4C, it can be ascertained that SAR overshoot that causes the luminance of the first frame to increase occurs when the image pattern changes from black to white (Black→White).

As described above, in order to prevent or at least reduce SAR overshoot that occurs due to differences in the discharging time of the OLED caused by changes in an image pattern, the voltage of the anode of the OLED needs to be maintained as a constant voltage.

Figure 5:
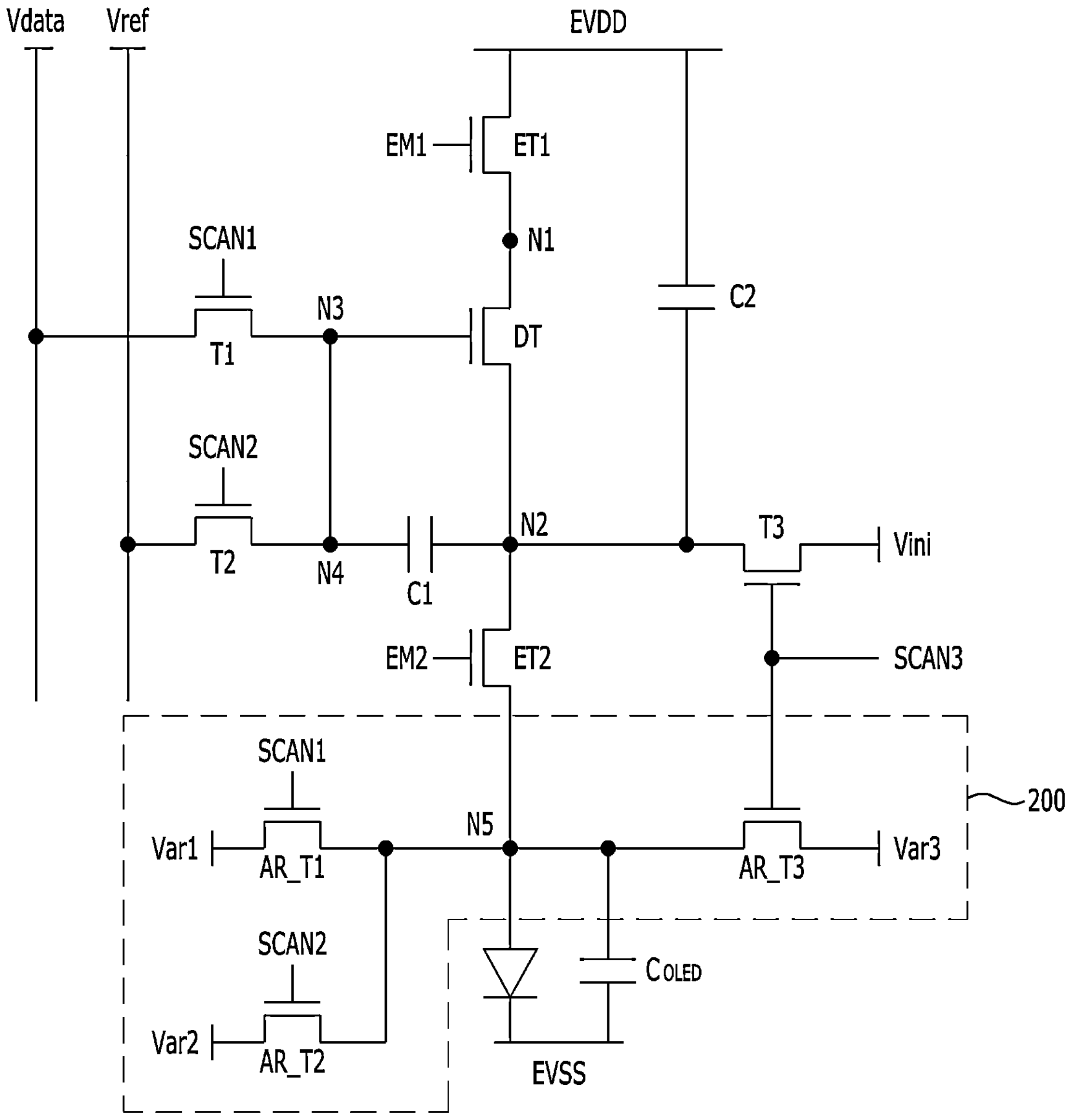
FIG. 5 is an equivalent circuit diagram of one subpixel included in a display device according to an embodiment of the present disclosure.

FIG. 5 is an equivalent circuit diagram of one subpixel included in a display device according to an embodiment of the present disclosure. In the following description, the first electrode of the transistor may be one of the source electrode and the drain electrode, and the second electrode of the transistor may be the other one of the source electrode and the drain electrode.

The subpixel according to the embodiment of the present disclosure differs from the subpixel shown in FIG. 2 in that it includes an anode reset unit 200. The anode reset unit 200 may apply the anode reset voltage Var to the fifth node N5 to which the anode of the OLED is connected in response to each of the first scan signal SCAN1, the second scan signal SCAN2, and the third scan signal SCAN3 for driving the subpixel. In this manner, in the subpixel according to the embodiment of the present disclosure, the anode reset voltage Var is applied to the anode during each driving period, and thus the voltage of the anode can be constantly maintained at the anode reset voltage Var even if a difference in the discharging time of the OLED occurs according to a change in the image pattern.

The configuration of the subpixel according to the embodiment of the present disclosure including the anode reset unit 200 will be described in detail.

The subpixel SP according to the embodiment of the present disclosure may be provided with the high voltage EVDD, the low voltage EVSS, the reference voltage Vref, the data voltage Vdata, the initialization voltage Vini, and the anode reset voltage Var and may receive the first to third scan signals SCAN1 to SCAN3, the first emission signal EM1, and the second emission signal EM2.

One subpixel SP may include an organic light emitting diode (OLED), a driving TFT DT, a first capacitor C1, a second capacitor C2, a first emission control TFT ET1, a second emission control TFT ET2, first to third switching TFTs T1 to T3, and the anode reset unit 200. Each TFT of the subpixel SP may be configured as a p-type MOSFET (PMOS) or an n-type MOSFET (NMOS), or may be configured by mixing a p-type MOSFET (PMOS) and an n-type MOSFET (NMOS). A case where the subpixel SP according to the embodiment of the present disclosure is implemented as an n type will be described, but the present disclosure is not limited thereto.

The OLED emits light by driving current supplied from the driving TFT DT.

The anode of the OLED is connected to a fifth node N5, and the cathode of the OLED is connected to a line through which the low voltage EVSS is supplied.

The gate electrode of the driving TFT DT is connected to a third node N3, the first electrode thereof is connected to a first node N1, and the second electrode thereof is connected to a second node N2. The driving TFT DT can generate a driving current in response to the data voltage Vdata.

The first emission control TFT ET1 and the second emission control TFT ET2 control emission of the OLED. The first emission control TFT ET1 is turned on/off according to the first emission signal EM1 input to the gate electrode thereof, and the second emission control TFT ET2 is turned on/off according to the second emission signal EM2 input to the gate electrode thereof.

The first emission control TFT ET1 may have a first electrode to which the high voltage EVDD is applied and a second electrode connected to the first node N1. The first emission control TFT ET1 may serve to transmit the high voltage EVDD to the first electrode of the driving TFT DT in response to the first emission signal EM1.

The second emission control TFT ET2 may have a first electrode connected to the second node N2 and a second electrode connected to the fifth node N5. The second emission control TFT ET2 may serve to transmit the driving current to the fifth node N5 to which the anode of the OLED is connected in response to the second emission signal EM2.

The first switching TFT T1 applies the data voltage Vdata to the third node N3 to which the gate electrode of the driving TFT DT is connected. The first switching TFT T1 may include a gate electrode to which the first scan signal SCAN1 is input, a first electrode connected to a data line to which the data voltage Vdata is supplied, and a second electrode connected to the third node N3. The first switching TFT T1 may be implemented as an n-type oxide TFT. Accordingly, the first switching TFT T1 applies the data voltage Vdata supplied from the data line to the third node N3 to which the gate electrode of the driving TFT DT is connected in response to a high-level first scan signal SCAN1, which is a turn-on voltage.

The second switching TFT T2 applies the reference voltage Vref to a fourth node N4. The second switching TFT T2 may include a gate electrode to which the second scan signal SCAN2 is input, a first electrode connected to a reference voltage line through which the reference voltage Vref is supplied, and a second electrode connected to the fourth node N4. The second switching TFT T2 may be implemented as an n-type oxide TFT. Accordingly, the second switching TFT T2 applies the reference voltage Vref supplied from the reference voltage line to the fourth node N4 in response to the high-level second scan signal SCAN2, which is the turn-on voltage.

The third switching TFT T3 applies the initialization voltage Vini to the second node N2 to which the source electrode of the driving TFT DT is connected. The third switching TFT T3 may include a gate electrode to which the third scan signal SCAN3 is input, a first electrode to which the initialization voltage Vini is applied, and a second electrode connected to the second node N2.

The first capacitor C1 maintains the data voltage Vdata stored in the subpixel SP for one frame. One electrode of the first capacitor C1 is connected to the fourth node N4, and the other electrode is connected to the second node N2.

The second capacitor C2 serves to improve driving efficiency according to a driving current by reflecting a change in the source electrode of the driving TFT as much as a change in the gate electrode of the driving TFT DT when the reference voltage Vref changes to the data voltage Vdata. One electrode of the second capacitor C2 is connected to the high voltage EVDD, and the other electrode is connected to the second node N2.

The anode reset unit 200 (e.g., a circuit) may include a first anode reset switch AR_T1, a second anode reset switch AR_T2, and a third anode reset switch AR_T3 which apply the anode reset voltage Var to the fifth node N5 to which the anode of the OLED is connected in response to the first scan signal SCAN1, the second scan signal SCAN2, and the third scan signal SCAN3.

The first anode reset switch AR_T1 may include a gate electrode to which the first scan signal SCAN1 is input, a first electrode connected to the anode reset voltage Var, and a second electrode connected to the fifth node N5. The first anode reset switch AR_T1 may be turned on/off by receiving the first scan signal SCAN1 simultaneously with the first switching TFT T1.

The second anode reset switch AR_T2 may include a gate electrode to which the second scan signal SCAN2 is input, a first electrode connected to the anode reset voltage Var, and a second electrode connected to the fifth node N5. The second anode reset switch AR_T2 may be turned on/off by receiving the second scan signal SCAN2 simultaneously with the second switching TFT T2.

The third anode reset switch AR_T3 may include a gate electrode to which the third scan signal SCAN3 is input, a first electrode connected to the anode reset voltage Var, and a second electrode connected to the fifth node N5. The third anode reset switch AR_T3 may be turned on/off by receiving the third scan signal SCAN3 simultaneously with the third switching TFT T3.

As described above, the subpixel according to the embodiment of the present disclosure may include the first anode reset switch AR_T1, the second anode reset switch AR_T2, and the third anode reset switch AR_T3 capable of independently applying the anode reset voltage Var. Here, the anode reset switches AR_T1, AR_T2, and AR_T3 may operate by receiving the first to third scan signals SCAN1 to SCAN3 input to control the operations of the first to third switching TFTs T1 to T3. Therefore, although the subpixel includes the plurality of anode reset switches AR_T1, AR_T2, and AR_T3 for applying the anode reset voltage Var, the anode reset switches may be driven only using the existing scan signals SCAN1 to SCAN3 without adding new scan signals.

Figure 6:
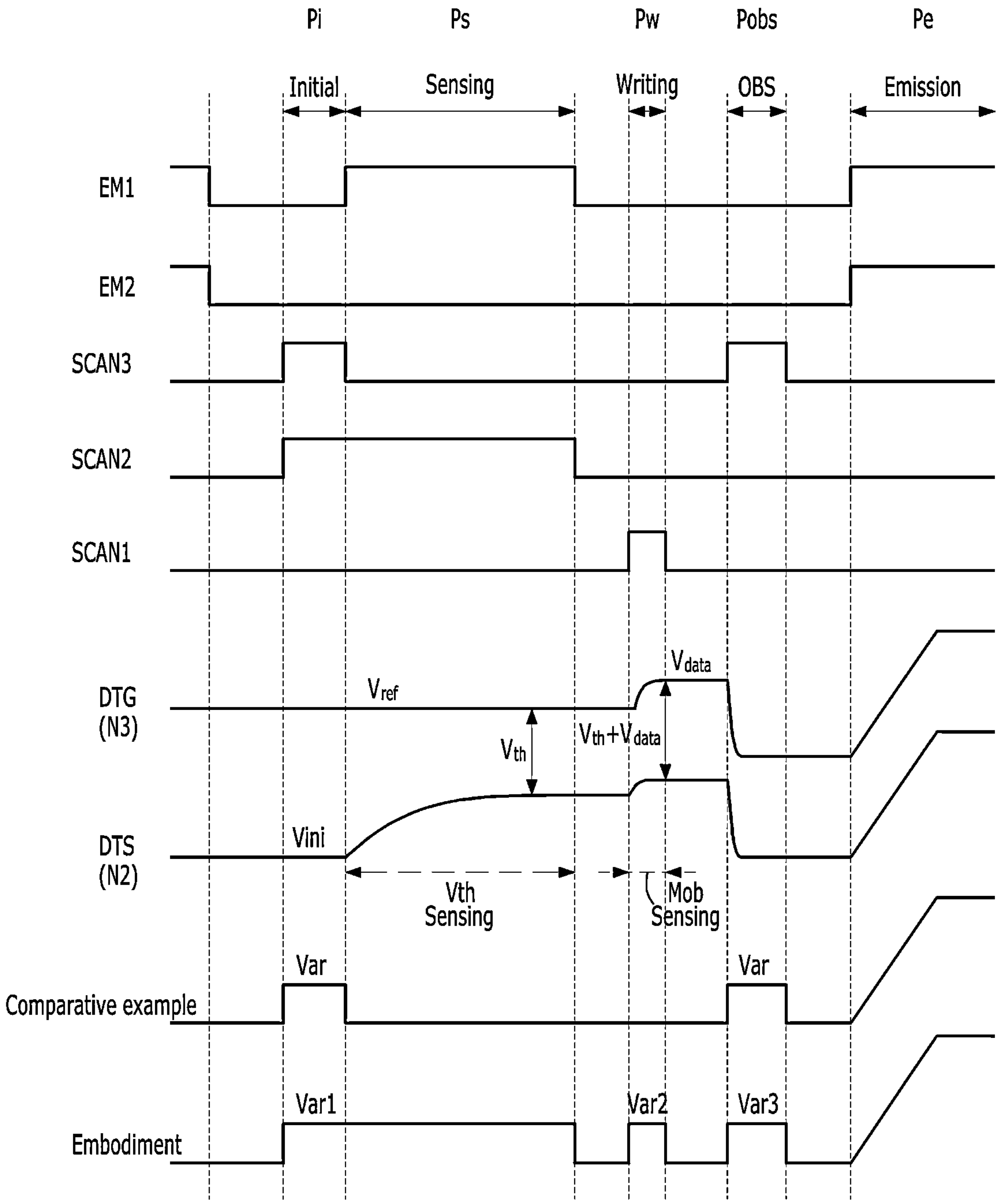
FIG. 6 is a diagram illustrating the driving waveforms of the subpixel of FIG. 5 and voltage changes at a gate node and a source node of a driving transistor according to an embodiment of the present disclosure.

FIG. 6 is a diagram illustrating driving waveforms of the subpixel of FIG. 5, voltage changes at the third node N3 to which the gate electrode of the driving TFT DT is connected and the fifth node N5 to which the source electrode is connected, and the waveform of the anode reset voltage Var. The driving waveforms of the first to third scan signals SCAN1, SCAN2, and SCAN3 and the first and second emission signals EM1 and EM2 for driving the subpixel of FIG. 5 may be substantially the same as the driving waveforms of the subpixel of FIG. 2 shown in FIG. 3. Although the subpixel according to the embodiment of the present disclosure includes the plurality of anode reset switches AR_T1, AR_T2, and AR_T3, they can be driven using the existing scan signals SCAN1 to SCAN3 without adding new scan signals. Further, the subpixel can apply the anode reset voltage Var to the anode during each driving period by applying the existing driving waveforms.

Figure 7:
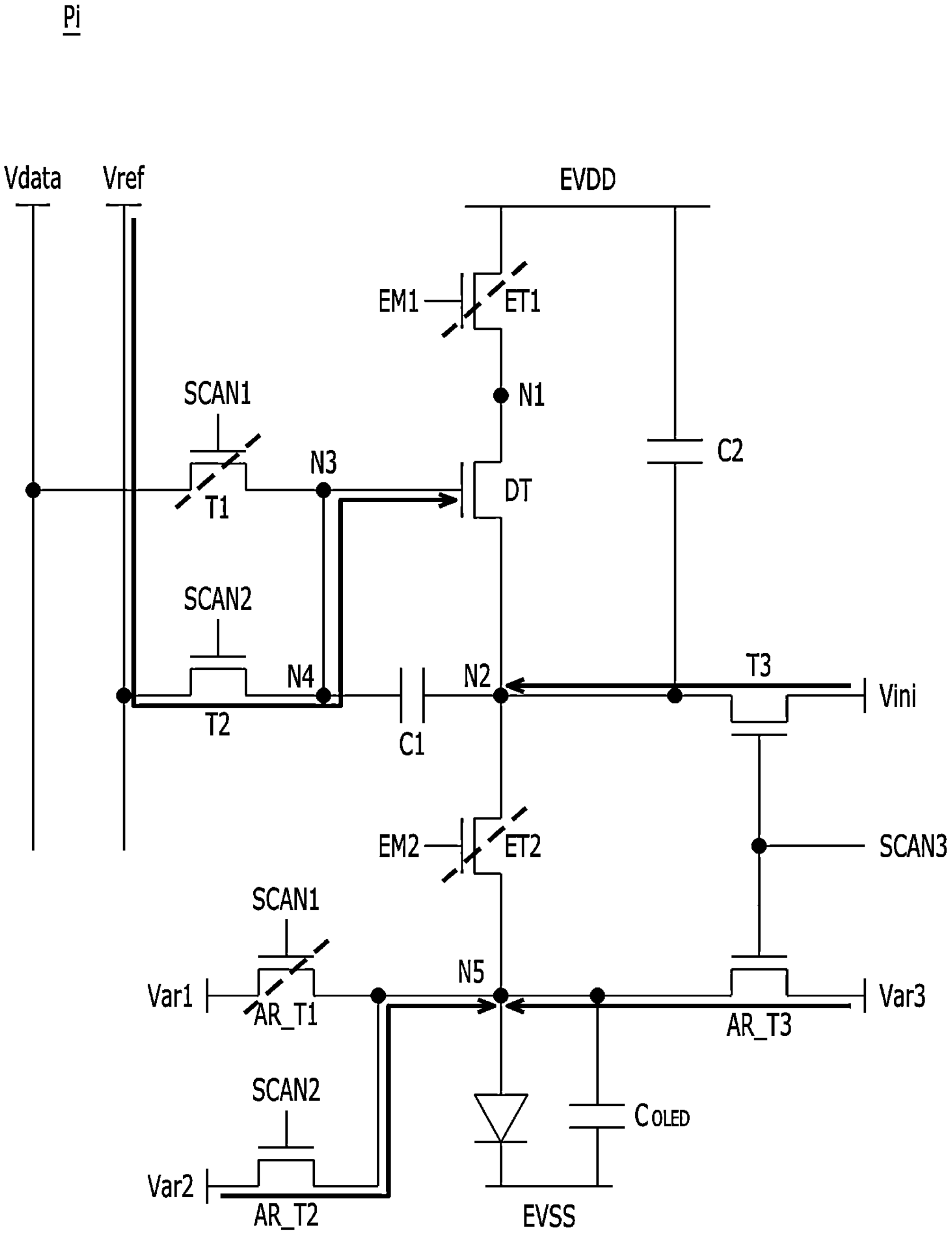
FIG. 7 is a diagram showing an operation of a pixel circuit shown in FIG. 5 in an initial period Pi according to an embodiment of the present disclosure.
Figure 8:
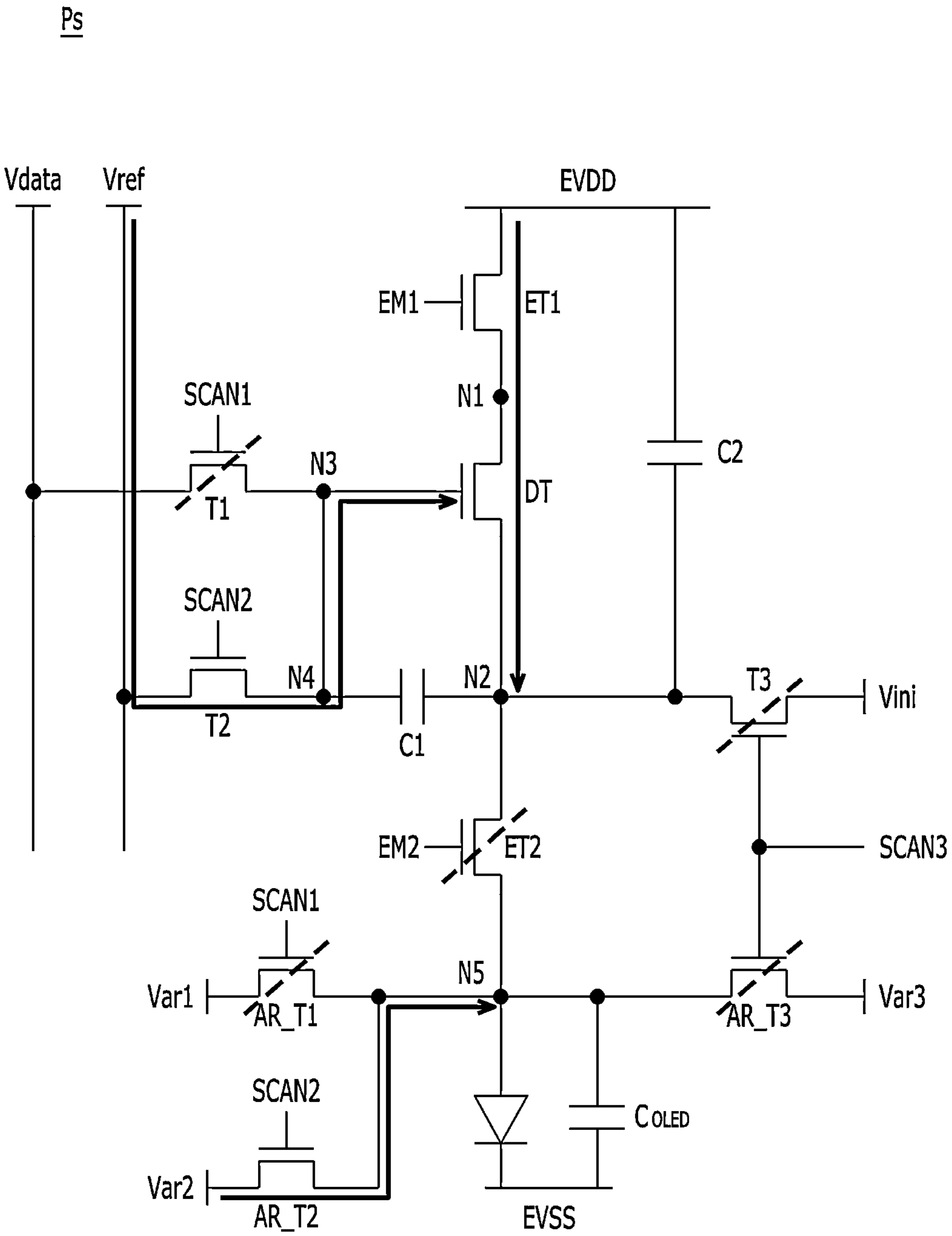
FIG. 8 is a diagram showing an operation of the pixel circuit shown in FIG. 5 in a sensing period Ps according to an embodiment of the present disclosure.
Figure 9:
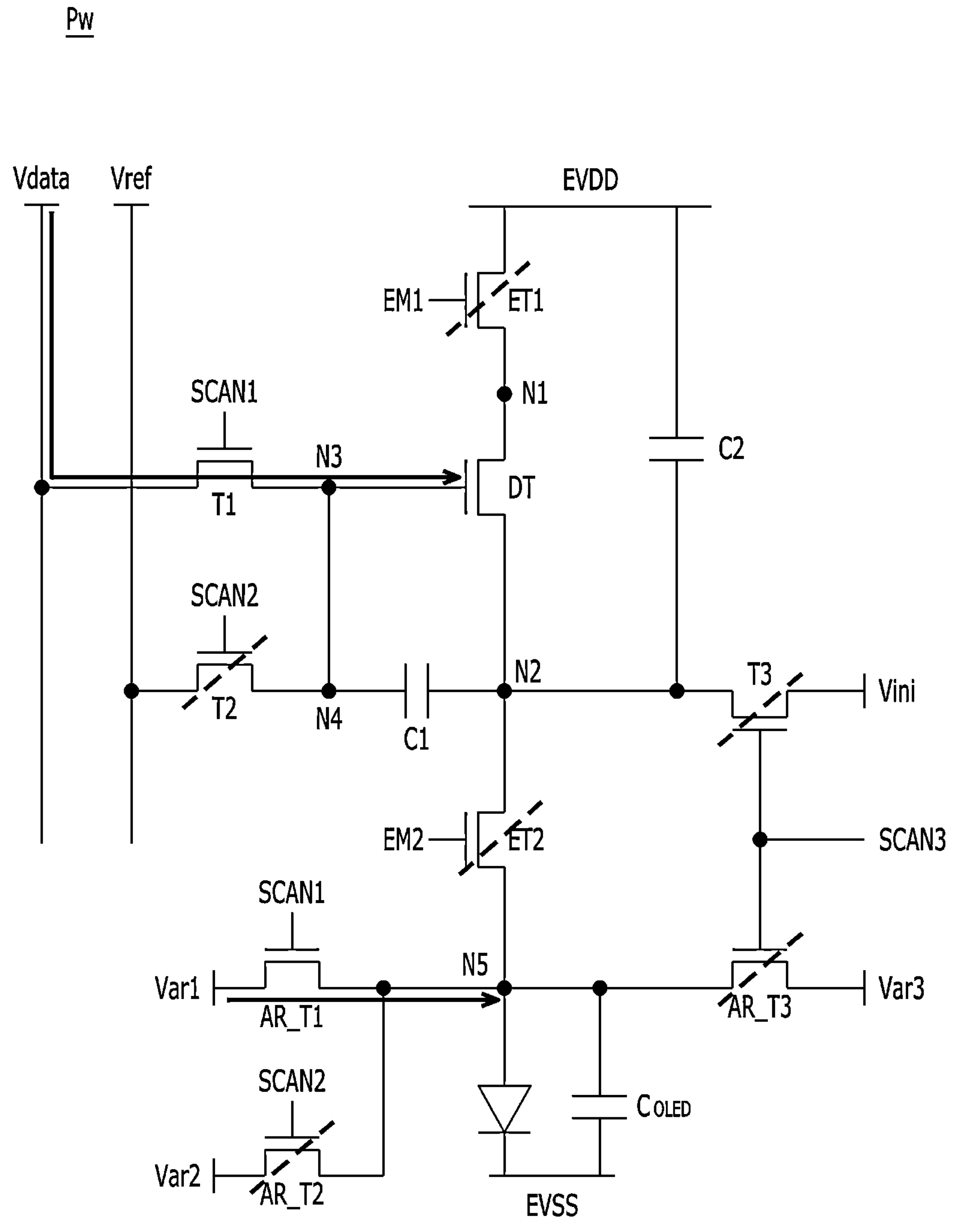
FIG. 9 is a diagram showing an operation of the pixel circuit shown in FIG. 5 in a data writing period Pw according to an embodiment of the present disclosure.
Figure 10:
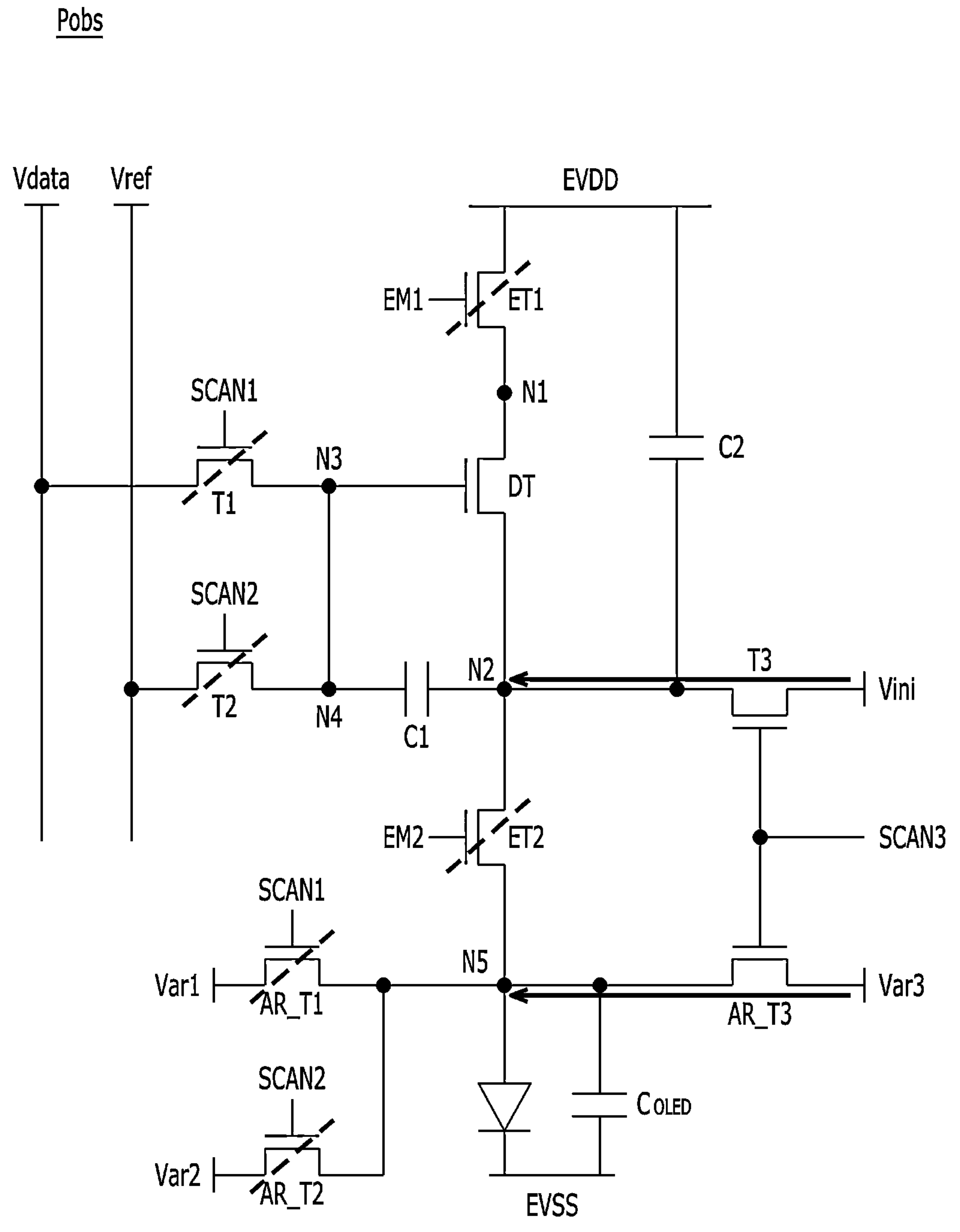
FIG. 10 is a diagram showing an operation of the pixel circuit shown in FIG. 5 in an OBS period Pobs according to an embodiment of the present disclosure.
Figure 11:
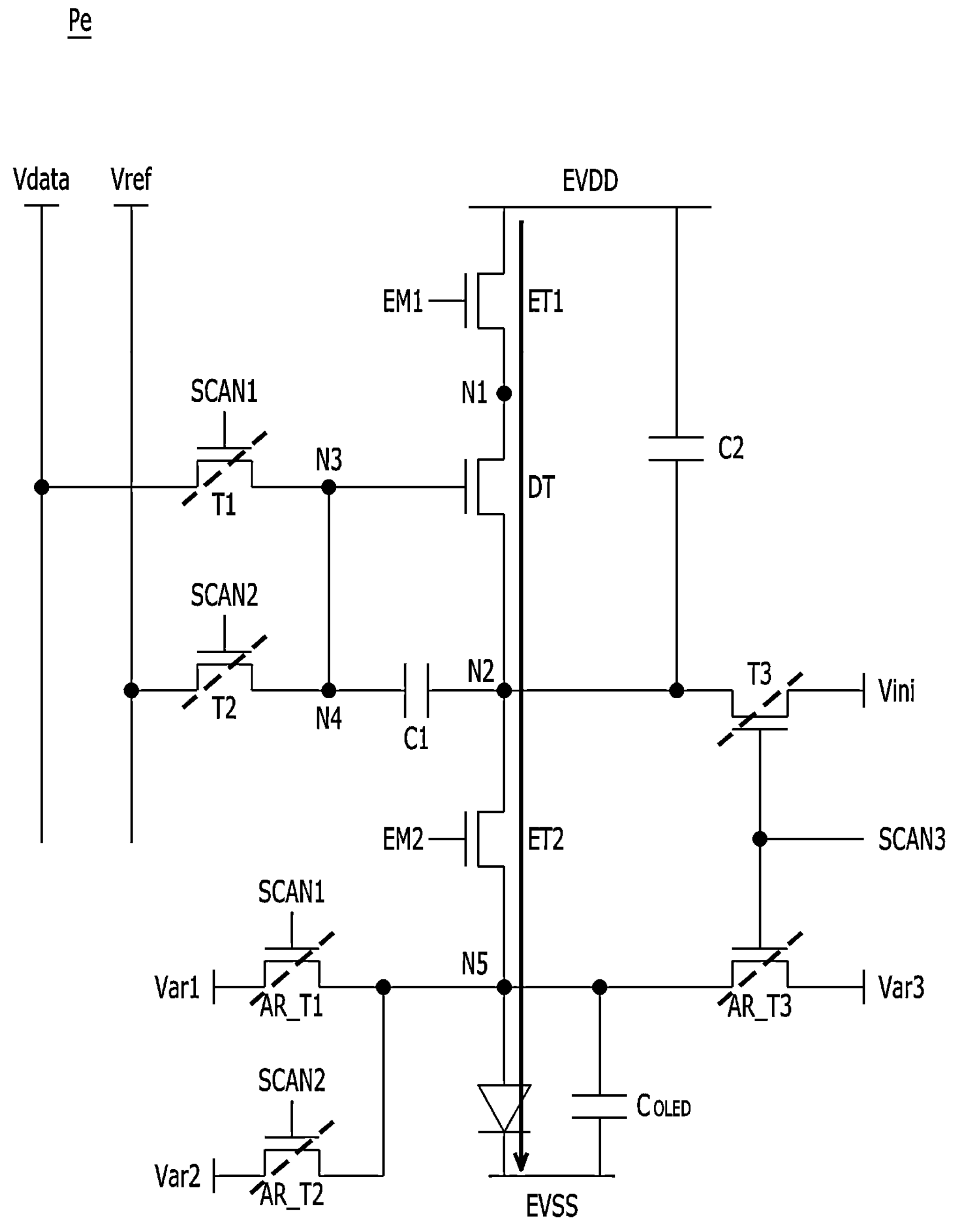
FIG. 11 is a diagram showing an operation of the pixel circuit shown in FIG. 5 in an emission period Pe according to an embodiment of the present disclosure.

Referring to FIG. 6, the driving period of the subpixel SP may include an initial period Pi, a sensing period Ps, a data writing period Pw, an OBS period Pobs, and an emission period Pe. FIG. 7 shows an operation of the pixel circuit in the initial period Pi according to one embodiment, FIG. 8 is a diagram showing an operation of the pixel circuit in the sensing period Ps according to one embodiment, FIG. 9 is a diagram showing an operation of the pixel circuit in the data writing period Pw according to one embodiment, FIG. 10 is a diagram showing an operation of the pixel circuit in the OBS period Pobs according to one embodiment, and FIG. 11 is a diagram showing an operation of the pixel circuit in the emission period Pe according to one embodiment. The operation of the pixel circuit in each driving period Pi, Ps, Pw, Pobs, and Pe) will be described in detail with reference to FIGS. 6 to 11.

Referring to FIGS. 6 and 7, during the initial period Pi, the second scan signal SCAN2 and the third scan signal SCAN3 are applied as on-level high signals, and the first emission signal EM1, the second emission signal EM2, and the first scan signal SCAN1 are applied as off-level low signals.

When the second scan signal SCAN2 is applied at the on level, the second switching TFT T2 and the second anode reset switch AR_T2 are turned on. The second switching TFT T2 applies the reference voltage Vref supplied through the reference line to the fourth node N4 and the third node N3 in response to the second scan signal SCAN2 at the on level. Accordingly, the reference voltage Vref is applied to the gate electrode of the driving TFT DT connected to the third node N3. The second anode reset switch AR_T2 applies the anode reset voltage Var to the fifth node N5 in response to the on-level second scan signal SCAN2. Accordingly, the anode reset voltage Var is applied to the anode of the OLED connected to the fifth node N5.

When the third scan signal SCAN3 is applied at the on level, the third switching TFT T3 and the third anode reset switch AR_T3 are turned on. The third switching TFT T3 applies the initialization voltage Vini to the second node N2 in response to the third scan signal SCAN3 at the on level. Accordingly, the initialization voltage Vini is applied to the source electrode of the driving TFT DT connected to the second node N2. The third anode reset switch AR_T3 applies the anode reset voltage Var to the fifth node N5 in response to the third scan signal SCAN3 at the on level. Accordingly, the anode reset voltage Var is applied to the anode of the OLED connected to the fifth node N5.

As described above, during the initial period Pi, the reference voltage Vref is applied to the gate electrode of the driving TFT DT, the initialization voltage Vini is applied to the source electrode, and the anode reset voltage Var is applied to the anode of the OLED.

Referring to FIGS. 6 and 8, during the sensing period Ps, the first emission signal EM1 and the second scan signal SCAN2 are applied as on-level high signals, and the second emission signal EM2, the first scan signal SCAN1, and the third scan signal SCAN3 are applied as off-level low signals. The threshold voltage Vth of the driving TFT DT may be sensed during the sensing period Ps, and the sensing period Ps may be set to about 100 μs.

When the first emission signal EM1 is applied at the on level, the first emission control TFT ET1 is turned on. The first emission control TFT ET1 applies the high voltage EVDD to the first node N1 in response to the first emission signal EM1 at the on level. Accordingly, the high voltage EVDD is applied to the drain electrode of the driving TFT DT connected to the first node N1.

When the second scan signal SCAN2 is applied at the on level, the second switching TFT T2 and the second anode reset switch AR_T2 are turned on.

The second anode reset switch AR_T2 applies the anode reset voltage Var to the fifth node N5 in response to the on-level second scan signal SCAN2. Accordingly, the anode reset voltage Var is applied to the anode of the OLED connected to the fifth node N5.

The second switching TFT T2 applies the reference voltage Vref supplied through the reference line to the third node N3 to which the gate electrode DTG of the driving TFT DT is connected in response to the second scan signal SCAN2 at the on level. “Vref-Vini” is set to have a value greater than the threshold voltage Vth of the driving TFT DT. Since the high voltage EVDD is applied to the drain electrode of the driving TFT DT and the reference voltage Vref is applied to the gate electrode, a channel is formed between the drain and the source according to the difference “Vref-Vini” corresponding to the gate-source voltage Vgs and a current Ids flows. Since the drain-source current Ids flows according to the magnitude of the gate-source voltage Vgs in a state in which the voltage of the gate electrode DTG is fixed to the reference voltage Vref, the voltage of the source electrode DTS of the driving TFT DT gradually increases, and when the gate-source voltage Vgs reaches the threshold voltage Vth, current flow is blocked. At this time, the voltage difference between the gate electrode DTG and the source electrode DTS may be sensed as the threshold voltage Vth of the driving TFT DT.

The aforementioned process of sensing the threshold voltage Vth is performed in a state in which the gate electrode DTG is fixed to the reference voltage Vref and the source electrode DTS is in a floating state, and thus the source electrode DTS may be coupled with the voltage of the fifth node N5 to which the anode of the OLED is connected. Accordingly, the embodiment of the present disclosure may block coupling between the voltage of the anode of the OLED and the source electrode DTS of the driving TFT DT by performing the process of sensing the threshold voltage Vth while fixing the voltage of the fifth node N5 to the anode reset voltage Var. As a result, the accuracy of sensing and compensation of the threshold voltage Vth of the driving TFT DT can be improved.

Thereafter, when transition of the first emission signal EM1 and the second scan signal SCAN2 to off-level low signals occurs, the threshold voltage Vth of the driving TFT DT can be maintained by the first capacitor C1 connected between the third node N3 and the second node N2. That is, the threshold voltage Vth corresponding to the gate-source voltage Vgs of the driving TFT DT may be stored in the first capacitor C1 as a compensation voltage.

Referring to FIGS. 6 and 9, during the data writing period Pw, the first scan signal SCAN1 is applied as an on-level high signal, and the first emission signal EM1, the second emission signal EM2, the second scan signal SCAN2, and the third scan signal SCAN3 are applied as off-level low signals. During the data writing period Pw, the data voltage Vdata may be written by reflecting mobility compensation of the driving TFT DT.

When the first scan signal SCAN1 is applied at the on level, the first switching TFT T1 and the first anode reset switch AR_T1 are turned on.

The first anode reset switch AR_T1 applies the anode reset voltage Var to the fifth node N5 in response to the first scan signal SCAN1 at the on level. Accordingly, the anode reset voltage Var is applied to the anode of the OLED connected to the fifth node N5.

The first switching TFT T1 applies the data voltage Vdata supplied through the data line to the third node N3 to which the gate electrode DTG of the driving TFT DT is connected in response to the first scan signal SCAN1 at the on level. The voltage of the gate electrode DTG rises from the reference voltage Vref by the data voltage Vdata, and a current Ids corresponding to the data voltage Vdata flows through the driving TFT DT. At this time, the magnitude of the flowing current Ids is proportional to the mobility of the driving TFT DT, a relatively small amount of charge is charged in the first capacitor C1 when the mobility is low, and a relatively large amount of charge is charged in the first capacitor C1 when the mobility is high. Thereafter, the amount of current applied to the OLED is determined by the voltage charged in the first capacitor C1 during emission, and thus compensation of the mobility of the driving TFT DT can be performed.

The aforementioned process of writing the data voltage Vdata and compensating for the mobility may be performed by fixing the voltage of the gate electrode DTG to the data voltage Vdata. However, the voltage of the gate electrode DTG may be coupled with the voltage of the fifth node N5 to which the anode of the OLED is connected. Accordingly, the embodiment of the present disclosure may block coupling between the voltage of the anode of the OLED and the gate electrodes DTG of the driving TFT DT by performing the process of writing the data voltage Vdata and compensating for the mobility while fixing the voltage of the fifth node N5 to the anode reset voltage Var. As a result, the accuracy of data voltage writing and mobility compensation can be improved.

Thereafter, transition of the first scan signal SCAN1 to an off-level low signal occurs and the gate-source voltage Vgs may be maintained by the first capacitor C1 connected between the third node N3 and the second node N2. That is, the data voltage with the compensated threshold voltage Vth and mobility may be stored in the first capacitor C1.

Referring to FIGS. 6 and 10, during the OBS period Pobs, the third scan signal SCAN3 is applied as an on-level high signal, and the first emission signal EM1, the second emission signal EM2, the first scan signal SCAN1, and the second scan signal SCAN2 are applied as off-level low signals.

When the third scan signal SCAN3 is applied at the on level, the third switching TFT T3 and the third anode reset switch AR_T3 are turned on.

The third anode reset switch AR_T3 applies the anode reset voltage Var to the fifth node N5 in response to the third scan signal SCAN3 at the on level. Accordingly, the anode reset voltage Var is applied to the anode of the OLED connected to the fifth node N5.

The third switching TFT T3 applies the initialization voltage Vini to the second node N2 in response to the third scan signal SCAN3 at the on level. Accordingly, the voltage of the source electrode DTS of the driving TFT DT drops to the initialization voltage Vini, and the voltage of the gate electrode DTG also drops by an amount equal to the voltage drop of the source electrode DTS.

Referring to FIGS. 6 and 11, during the emission period Pe, the first emission signal EM1 and the second emission signal EM2 are applied as on-level high signals, and the first scan signal SCAN1, the scan signal SCAN2, and the third scan signal SCAN3 are applied as off-level low signals.

When the first emission signal EM1 is applied at the on level, the first emission control TFT ET1 is turned on, and when the second emission signal EM2 is applied at the on level, the second emission control TFT ET2 is turned on. The high voltage EVDD is applied to the first node N1 as the first emission control TFT ET1 is turned on, and a current path is formed between the second node N2 and the fifth node N5 as the second emission control TFT ET2 is turned on. Accordingly, the driving current Ioled generated through the drain electrode and the source electrode of the driving TFT DT can be applied to the OLED according to the compensation voltage and the data voltage Vdata stored in the first capacitor C1, and thus the OLED emits light.

As described above, the subpixel according to the comparative example (refer to FIG. 2) performs anode resetting only during the initial period Pi and the OBS period Pobs in the pixel driving period, whereas the subpixel according to the embodiment (refer to FIG. 5) may perform anode resetting during the initial period Pi, sensing period Ps, data writing period Pw, and OBS period Pobs.

Figure 12:
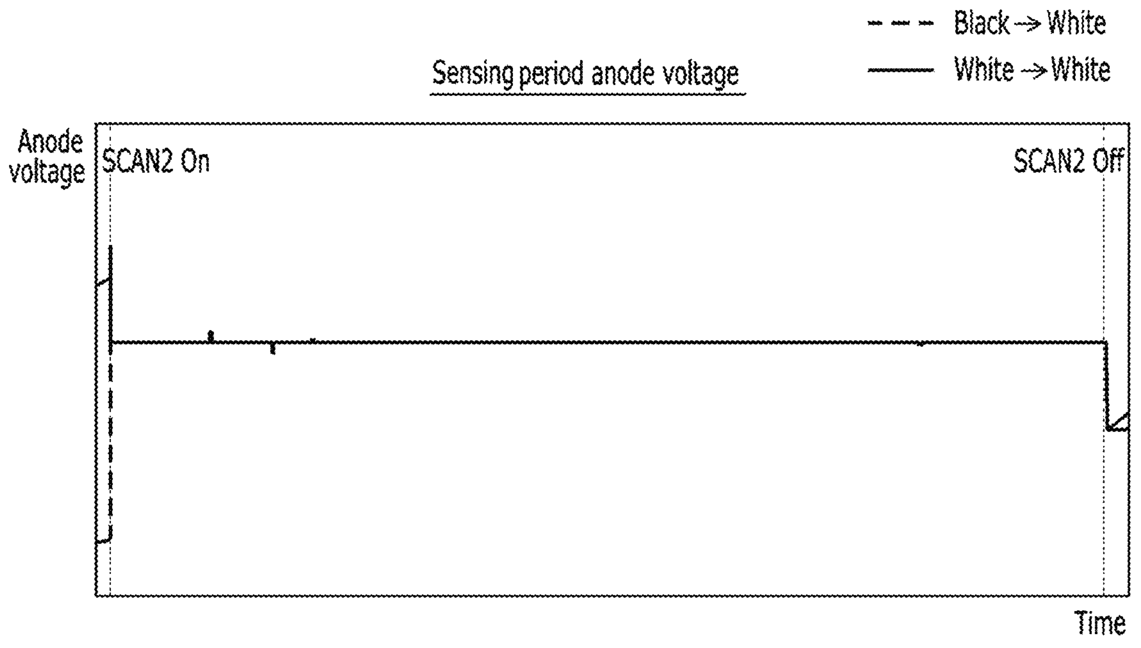
FIGS. 12 to 15 are diagrams for describing results of simulating the display device according to an embodiment of the present disclosure.
Figure 13:
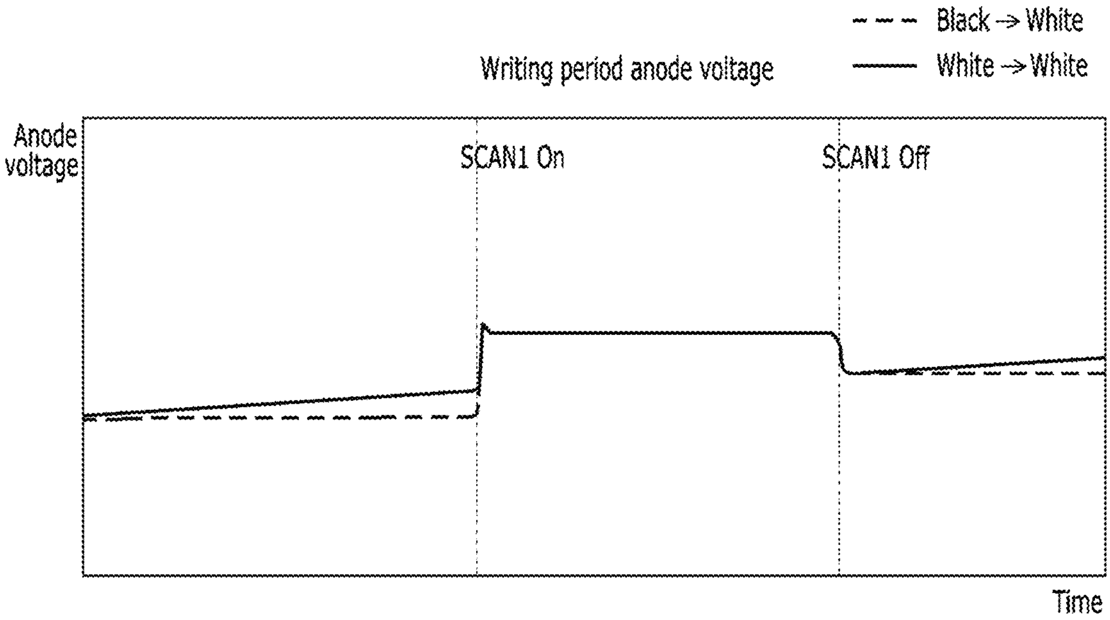
Figure 14:
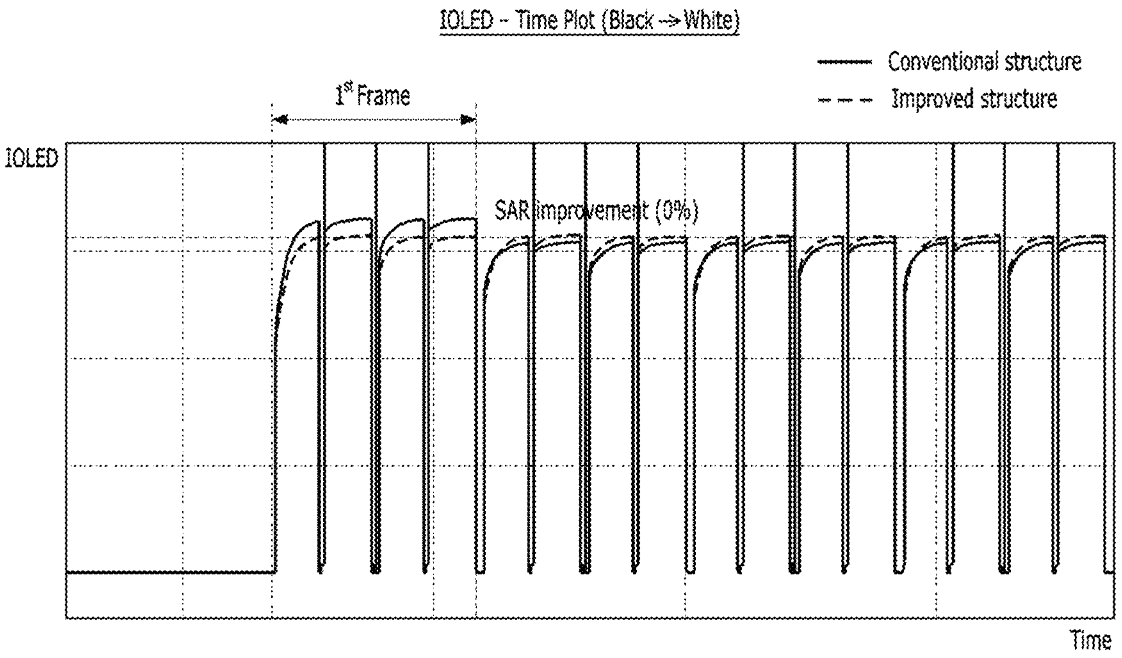

FIGS. 12 to 14 are diagrams for describing results of simulating the shooting amount ratio (SAR) of the display device according to an embodiment of the present disclosure.

FIG. 12 is a graph showing results of simulations of changes in the anode voltage in the sensing period Ps in a case where an image pattern changes from black to white (Black→White) and a case where the image pattern changes from white to white (White→White).

During the sensing period Ps, the second scan signal SCAN2 is applied at the on level, and thus the second switching TFT T2 and the second anode reset switch AR_T2 are turned on.

The second switching TFT T2 applies the reference voltage Vref to the gate electrode of the driving TFT DT in response to the on-level second scan signal SCAN2. During the sensing period Ps, the threshold voltage Vth of the driving TFT DT may be sensed on the basis of the gate-source voltage Vgs of the driving TFT DT as the reference voltage Vref is applied to the gate electrode.

The second anode reset switch AR_T2 applies the anode reset voltage Var to the fifth node N5 in response to the on-level second scan signal SCAN2. Accordingly, the anode reset voltage Var is applied to the anode of the OLED connected to the fifth node N5.

Accordingly, coupling between the anode and the source electrode DTS of the driving TFT DT, which may occur during the sensing period Ps, is blocked.

As a result, as shown in FIG. 12, the anode of the OLED can be maintained at the anode reset voltage Var regardless of changes in the image pattern.

FIG. 13 is a graph showing results of simulations of changes in the anode voltage in the data writing period Pw in a case where an image pattern changes from black to white (Black→White) and a case where the image pattern changes from white to white (White→White).

During the data writing period Pw, the first scan signal SCAN1 is applied at the on level, and thus the first switching TFT T1 and the first anode reset switch AR_T1 are turned on.

The first switching TFT T1 applies the data voltage Vdata to the gate electrode of the driving TFT DT in response to the first scan signal SCAN1 at the on level. In the data writing period Pw, the data voltage Vdata with compensated mobility may be written on the basis of the gate-source voltage Vgs of the driving TFT DT as the data voltage Vdata is applied to the gate electrode.

The first anode reset switch AR_T1 applies the anode reset voltage Var to the fifth node N5 in response to the first scan signal SCAN1 at the on level. Accordingly, the anode reset voltage Var is applied to the anode of the OLED connected to the fifth node N5.

Accordingly, coupling between the anode and the gate electrode DTG of the driving TFT DT, which may occur during the data writing period Pw, is blocked.

As a result, as shown in FIG. 13, the anode of the OLED can be maintained at the anode reset voltage Var regardless of changes in the image pattern.

As described above, the anode reset voltage Var can be applied to the anode during the sensing period Ps and the data writing period Pw to block coupling between the anode and the gate electrode or the source electrode of the driving TFT DT.

FIG. 14 is a graph showing results of simulations of changes in the current value of the OLED over time when an image pattern changes from black to white (Black→White).

According to the embodiment of the present disclosure, it is possible to apply the anode reset voltage Var to the anode during the sensing period Ps and the data writing period Pw to block coupling between the anode and the gate electrode or the source electrode of the driving TFT DT.

As a result, when comparing the SAR overshoot with increasing luminance in the first frame, as shown in FIG. 14, it can be ascertained that SAR overshoot of the improved structure (dotted line) is significantly reduced compared to the existing structure (solid line).

Figure 15:
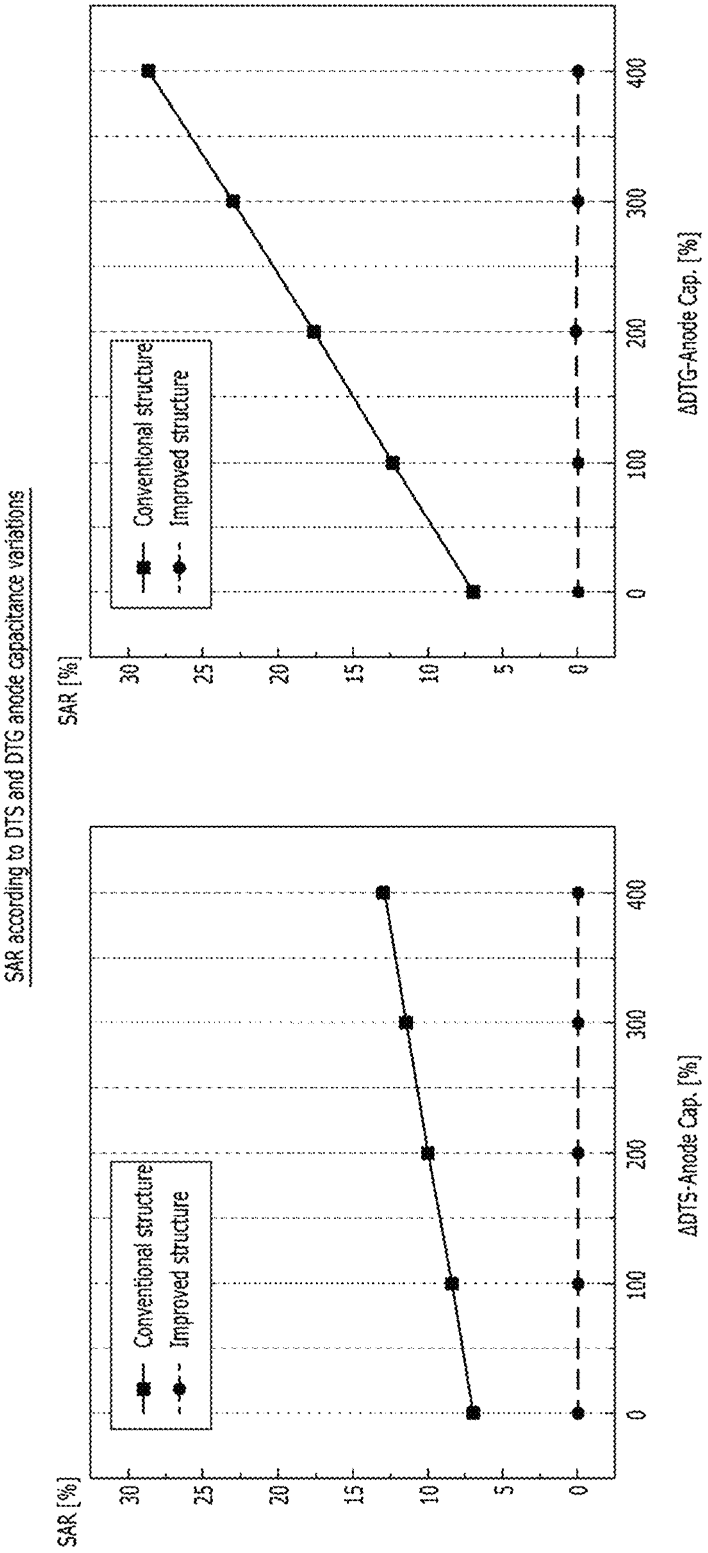

FIG. 15 is graphs showing results of simulations of SAR variation according to the capacitance between the source electrode DTS of the driving TFT DT and the anode and SAR variations according to the capacitance between the gate electrode DTG of the driving TFT DT and the anode.

As shown in the graphs of FIG. 15, according to the improved structure, it can be ascertained that SAR overshoot is prevented regardless of changes in the capacitance between the source electrode DTS of the driving TFT DT and the anode and the capacitance between the gate electrode DTG of the driving TFT DT and the anode.

The subpixel according to the embodiment of the present disclosure includes the first anode reset switch AR_T1, the second anode reset switch AR_T2, and the third anode reset switch AR_T3, which can independently apply the anode reset voltage Var, and thus the anode reset voltage Var can be applied in each driving period of the subpixel.

Here, the anode reset switches AR_T1, AR_T2, and AR_T3 may operate by receiving the first to third scan signals SCAN1 to SCAN3 input to control the operations of the first to third switching TFTs T1 to T3. Therefore, although the subpixel includes the plurality of anode reset switches AR_T1, AR_T2, and AR_T3 in order to apply the anode reset voltage Var, the anode reset switches can be driven using the existing scan signals SCAN1 to SCAN3 without adding new scan signals, and the subpixel can apply the anode reset voltage Var to the anode during each driving period by applying the existing driving waveforms.

In addition, the subpixel according to the embodiment of the present disclosure performs anode resetting in all of the initial period Pi, the sensing period Ps, the data writing period Pw, and the OBS period Pobs, and thus the anode of the OLED can be maintained at an anode reset voltage Var regardless of changes in an image pattern. Accordingly, coupling between the anode and the electrode of the driving TFT DT that may occur during each driving period can be blocked, and SAR overshoot caused by changes in an image pattern can be prevented.

Embodiments of the present disclosure have the following effects.

Embodiments of the present disclosure can provide a display device including a pixel driving circuit for accurate grayscale expression and a method of driving the same.

Embodiment of the present disclosure can reduce SAR overshoot that causes the luminance of the first frame to increase when an image pattern changes from black to white, compared to change from white to white.

Embodiments of the present disclosure can perform anode resetting in multiple subpixel driving stages with a simple circuit configuration and a small design area.

The effects according to the present disclosure are not limited to the above-described effects, and various other effects are within the scope of the present disclosure.

Although embodiments of the present disclosure have been described in more detail with reference to the accompanying drawings, the present disclosure is not necessarily limited to these embodiments, and various modifications may be made without departing from the technical spirit of the present disclosure. Accordingly, the embodiments disclosed in the present disclosure are not intended to limit the technical idea of the present disclosure, but rather to explain the technical idea, and the scope of the technical idea of the present disclosure is not limited by these embodiments. Therefore, the embodiments described above should be understood in all respects as illustrative and not restrictive. The scope of the present disclosure should be interpreted in accordance with the claims, and all technical ideas within the equivalent scope should be interpreted as being within the scope of the present disclosure.

What is claimed is:

1. A display device comprising:

a light emitting element including an anode to which a driving power is input and a cathode to which a low power is applied;

a first emission control thin film transistor (TFT) including a first emission electrode to which a high power is input, a second emission electrode connected to a first node, and a first emission gate electrode in which a first emission signal is applied;

a driving TFT including a first driving electrode connected to the first node, a second driving electrode connected to a second node, and a driving gate electrode;

a switching circuit configured to apply a first voltage for sensing characteristics of the driving TFT or a second voltage for driving the driving TFT to the driving gate electrode when an on-level scan signal is input;

a second emission control TFT including a third emission electrode connected to the second node, a second emission electrode connected to the anode, and a second emission gate electrode in which a second emission signal is applied; and an anode reset circuit configured to apply an anode reset voltage to the anode of the light emitting element, during the second emission signal at an off-level is applied to the second emission gate electrode, wherein the first emission signal at an on-level is input at least part of a period during which the second emission signal at the off-level is input.

2. The display device of claim 1, wherein the switching circuit comprises:

a first switching TFT configured to apply the second voltage to the driving gate electrode of the driving TFT when a first scan signal at an on level is input; and a second switching TFT configured to apply the first voltage to the driving gate electrode of the driving TFT when a second scan signal at the on level is input.

3. The display device of claim 2, wherein the anode reset circuit comprises:

a first anode reset TFT configured to apply a first anode reset voltage to the anode of the light emitting element when the first scan signal at the on level is input; and a second anode reset TFT configured to apply a second anode reset voltage to the anode of the light emitting element when the second scan signal at the on level is input.

4. The display device of claim 3, wherein the switching circuit comprises a third switching TFT configured to apply an initialization voltage to a source electrode of the driving TFT when a third scan signal at the on level is input.

5. The display device of claim 4, wherein the anode reset circuit comprises a third anode reset TFT configured to apply a third anode reset voltage to the anode of the light emitting element when the third scan signal at the on level is input.

6. The display device of claim 5, wherein the first anode reset voltage, the second anode reset voltage, and the third anode reset voltage have a same magnitude.

7. The display device of claim 1, further comprising:

a capacitor having a first electrode connected to the driving gate electrode and a second electrode connected to the second electrode.

8. A display device comprising:

a light emitting element;

a driving thin film transistor (TFT) including a first driving electrode connected to a first node, a second driving electrode connected to a second node, and a driving gate electrode connected to a third node and configured to apply a current according to a reference voltage applied to the third node to the second node during a sensing operation and to control a high voltage applied to the first node according to a data voltage applied to the driving gate electrode and apply the controlled high voltage to the second node during an emission operation;

a first switching TFT including a first switching gate electrode to which a first scan signal is input, a first switching electrode connected to a data line through which the data voltage is applied, and a second switching electrode connected to the third node;

a second switching TFT including a second switching gate electrode to which a second scan signal is input, a third switching electrode connected to a reference voltage line through which the reference voltage is applied, and a fourth switching electrode connected to a fourth node connected to the third node;

a capacitor connected to the fourth node and the second node;

a first emission control TFT including a first emission gate electrode through which a first emission signal is input, a first emission electrode connected to a line to which the high voltage is applied, and a second emission electrode connected to the first node;

a second emission control TFT including a second emission gate electrode through which a second emission signal is input, a third emission electrode connected to the second node, and a fourth emission electrode connected to an anode of the light emitting element;

a first anode reset TFT including a first reset gate electrode to which the first scan signal is input, a first reset electrode connected to a power line to which an anode reset voltage is applied, and a second reset electrode connected to an anode of the light emitting element; and a second anode reset TFT including a second reset gate electrode to which the second scan signal is input, a third reset electrode connected to a power line to which the anode reset voltage is applied, and a fourth reset electrode connected to the anode of the light emitting element, wherein the anode reset voltage is applied to the anode of the light emitting element, during the second emission signal at an off-level is input, and wherein the first emission signal at an on-level is input at least part of a period during which the second emission signal at the off-level is input.

9. The display device of claim 8, further comprising:

a third switching TFT including a third switching gate electrode to which a third scan signal is input, a fifth switching electrode connected to a power line to which an initialization voltage is applied, and a sixth switching electrode connected to the second node; and a third anode reset TFT including a third reset gate electrode to which the third scan signal is input, a fifth reset electrode connected to the power line to which the anode reset voltage is applied, and a sixth reset electrode connected to the anode of the light emitting element.

10. A method of driving a display device including a display panel including a plurality of subpixels having light emitting elements, the method comprising:

an initialization step of initializing a gate electrode and a source electrode of a driving thin film transistor (TFT) of each of the plurality of subpixels, during a first emission signal at an off-level and a second emission signal at an off-level are input;

a sensing step of sensing a threshold voltage of the driving TFT, during the first emission signal at an on-level and the second emission signal at the off-level are input;

a data writing step of writing a data voltage for driving the driving TFT, during the first emission signal at the off-level and the second emission signal at the off-level are input; and an emission step of causing the plurality of subpixels to emit light according to the data voltage, during the first emission signal at an on-level is input and the second emission signal at the on-level is input, wherein anodes of the light emitting elements are reset in the initialization step, the sensing step and the data writing step, during the second emission signal at the off-level is input.

11. The method of claim 10, further comprising:

resetting the anodes of the light emitting elements between the data writing step and the emission step, during the first emission signal at an off-level is input and the second emission signal at the off-level is input.

* * * * *